(12) United States Patent
Ota et al.

(10) Patent No.: US 7,798,671 B2
(45) Date of Patent: Sep. 21, 2010

(54) DISPLAY DEVICE

(75) Inventors: Takayuki Ota, Oamishirasato (JP);
Shimon Itakura, Mobara (JP); Naotoshi Sumiya, Mobara (JP)

(73) Assignee: Hitachi Displays, Ltd., Mobara-shi (JP)

(*) Notice: Subject to any disclaimer, the term of this patent is extended or adjusted under 35 U.S.C. 154(b) by 168 days.

(21) Appl. No.: 11/501,840

(22) Filed: Aug. 10, 2006

(65) Prior Publication Data

US 2007/0035946 A1 Feb. 15, 2007

(30) Foreign Application Priority Data

Aug. 10, 2005 (JP) .............................. 2005-232069

(51) Int. Cl.
*F21S 4/00* (2006.01)
(52) U.S. Cl. .................. 362/225; 362/235; 362/260; 362/614; 362/613; 362/227
(58) Field of Classification Search ................ 362/225, 362/235, 260, 613, 614, 227
See application file for complete search history.

(56) References Cited

U.S. PATENT DOCUMENTS

| 6,692,137 | B2* | 2/2004 | Blanchard | 362/241 |
| 7,221,108 | B2* | 5/2007 | Gu et al. | 315/312 |
| 7,322,717 | B2* | 1/2008 | Takata | 362/225 |
| 2005/0057946 | A1* | 3/2005 | Kim | 362/561 |
| 2006/0002107 | A1* | 1/2006 | Jeong | 362/225 |

FOREIGN PATENT DOCUMENTS

JP 2002-082626 3/2002

* cited by examiner

*Primary Examiner*—Sandra L O'Shea
*Assistant Examiner*—Jessica L McMillan
(74) *Attorney, Agent, or Firm*—Antonelli, Terry, Stout & Kraus, LLP.

(57) ABSTRACT

In a liquid crystal TV, there is provided a direct back light for increasing brightness in the vicinity of the center of a screen. Plural fluorescent tubes are used for backlight, and the respective two fluorescent tubes are paired and driven. The arrangement intervals of the respective pairs are made smallest in the vicinity of the center of the screen to increase the brightness in the vicinity of the center of the screen. The use of the paired fluorescent tubes is to alleviate a variation of the brightness in each of the fluorescent tubes.

20 Claims, 18 Drawing Sheets

DISPLAY DEVICE

CLAIM OF PRIORITY

The present application claims priority from Japanese Application JP 2005-232069 filed on Aug. 10, 2005, the content of which is hereby incorporated by reference into this application.

FIELD OF THE INVENTION

The present invention relates to a display device, and more particularly, to an effective technique that is applied to a display device having a direct backlight unit.

BACKGROUND OF THE INVENTION

Up to now, a display device such as a television includes a liquid crystal display device using a liquid crystal display panel.

The liquid crystal display device used for the television includes, for example, a transmissive liquid crystal display panel, and a light source (backlight unit) is disposed behind the liquid crystal display panel.

The backlight unit is formed of, for example, a fluorescent tube such as a cold cathode fluorescent tube (CFL). The backlight unit using the fluorescent tube is classified into a direct type and an edge light type according to a position at which the fluorescent tube is arranged.

The direct backlight unit has plural fluorescent tubes arranged at the back of an image display area of the liquid crystal display panel, that is, in an area that is superimposed on the image display area. Also, a reflector is disposed at the back of the fluorescent tube viewed from the liquid crystal display panel. Also, optical parts such as an optical diffuser and an optical sheet are disposed between the liquid display panel and the fluorescent tube.

The direct backlight unit converts linear lights from the fluorescent tubes into a planar light by the optical member, and irradiates the image display area of the liquid crystal display panel with the light. In this situation, the number of fluorescent tubes, the intervals of the fluorescent tubes, and the positions of the optical members are generally determined so as to make the distribution of the brightness of the image display area uniform.

However, on the other hand, there may be required a backlight unit that exhibits a distribution in which the brightness in the vicinity of the center of the image display area in the vertical direction is high, and the brightness at the upper and lower ends of the image display area is low. As an arranging method that meets the above requirement, for example, there has been proposed a method in which the fluorescent tubes are arranged in such a manner that the intervals of the fluorescent tubes in the vicinity of the center in the vertical direction are narrower than the intervals of the fluorescent tubes at the upper and lower end portions (for example, refer to Japanese Patent Laid-Open No. 2002-82626).

SUMMARY OF THE INVENTION

In the direct backlight unit disclosed in Japanese Patent Laid-Open No. 2002-82626, the intervals of the respective fluorescent tubes are gradually broadened toward the upper and lower end portions from the vicinity of the center in the vertical direction. In this situation, for example, when the brightness of the respective fluorescent tubes is uniform, it is possible that the brightness in the vicinity of the center in the vertical direction is made high, and the brightness is gradually reduced toward the upper and lower end portions.

However, the respective fluorescent tubes actually have the variation of brightness. For that reason, there arises such a problem that a variation occurs in the distribution of the brightness on the display area, and it is difficult to approach an ideal distribution, for example, a distribution that the brightness is gradually reduced toward the upper and lower end portions from the vicinity of the center in the vertical direction.

The present invention has been made to address the above problems, and therefore one object of the present invention is to provide a technique that makes it possible to increase the brightness of an arbitrary position of a display device having a direct backlight unit.

Another object of the present invention is to provide a technique that makes it possible to increase the brightness of an arbitrary position of a display device having a direct backlight unit, and to reduce a variation of the brightness distribution in each of products.

The above and other objects and novel features of the present invention will be apparent from the description of the present specification as well as the attached drawings.

The outlines of the present invention described in the present application will be described below.

(1) A display device having plural fluorescent tubes arranged at the back of a display area of a display panel, wherein pairs of fluorescent tubes whose light emission portions are independent from each other are arranged at irregular intervals, an arrangement interval between the paired fluorescent tubes is the same as that of other paired fluorescent tubes, the arrangement intervals of the respective pairs of fluorescent tubes are narrowest in the vicinity of a predetermined boundary in the arrangement direction, and the intervals are broadened further with distance from the boundary.

(2) The display device according to the item (1), wherein the narrowest interval among the arrangement intervals of the respective pairs of fluorescent tubes is narrower than the arrangement interval of the paired fluorescent tubes.

(3) The display device according to the item (1) or (2), wherein the boundary is in the center of the display area of the display panel.

(4) The display device according to the item (1) or (2), wherein the number of pairs of fluorescent tubes arranged at both sides of the boundary is different from each other.

(5) The display device according to the item (4), wherein the number of pairs of fluorescent tubes which are arranged between the boundary and an upper side of the display area is smaller than that between the boundary and a lower side of the display area.

(6) The display device according to any one of the items (1) to (5), further comprising a support member that supports the end portions of the respective fluorescent tubes, wherein the support member includes a support portion that supports the fluorescent tubes that are arranged between the boundary and one end portion of the display area.

(7) The display device according to the item (6), wherein the support member has a first support portion that supports the fluorescent tubes which are arranged between the boundary and one end portion of the display area at one of opposed two sides, and a second support portion that supports the fluorescent tubes which are arranged between the boundary and another end portion of the display area at another side.

(8) The display device according to any one of the items (1) to (7), wherein a reflector is disposed at the back of the fluorescent tubes, and the reflector has convex portions between the respective pairs fluorescent tubes.

In the display device according to the present invention, as described in the item (1), the two fluorescent tubes are coupled as one pair, and the respective pairs are arranged at irregular intervals. Also, in this situation, the interval of the pair of fluorescent tubes which are disposed in the vicinity of the boundary of the display area is the narrowest, and the intervals of the pairs are broadened further with distance from the boundary. With this structure, a portion in the vicinity of the boundary, that is, a portion whose interval is the narrowest is high in the brightness, and the brightness is gradually reduced far from the boundary. Also, the pairs of fluorescent tubes which are disposed at certain intervals are disposed at irregular intervals, the brightness can be averaged even if a variation occurs in the brightness of the paired two fluorescent tubes (light emission characteristics). For that reason, it is possible to reduce the unevenness of brightness that is attributable to the variation in the brightness of the individual fluorescent tubes.

Also, in this example, for example, as described in the item (2), when the narrowest interval among the arrangement intervals of the respective pairs of fluorescent tubes is narrower than the arrangement interval of the paired fluorescent tubes, the relative brightness in the vicinity of the boundary can be increased.

Also, the boundary of the display area is set in the center of the display area, for example, as in the item (3). In this case, when the arrangement direction of the fluorescent tubes is perpendicular to the display area in the display device, the brightness distribution of the display area is the highest in the brightness in the vicinity of the center line in the vertical direction, and is gradually reduced in the brightness toward the upper and lower ends. A display device that prefers the above brightness distribution is, for example, a liquid crystal television.

The boundary of the display area is not limited to the setting as in the item (3), and can be arbitrarily set on an arbitrary position in the arrangement direction of the fluorescent tubes.

Also, when the pairs of fluorescent tubes are arranged, for example, the number of pairs may be equal to each other at both sides of the boundary, or the number of pairs may be different from each other at both sides of the boundary as in the item (4). In the case where the number of pairs that are arranged at both sides of the boundary is changed, for example, as in the item (5), the number of pairs that are arranged toward the upper side from the boundary is smaller than the number of pairs that are arranged toward the lower side from the boundary. With the above structure, for example, the boundary can be set toward the upper side from the center of the display area in the vertical direction, and an area (boundary) that is the highest in the brightness can be set toward the upper side from the center.

Also, the display device having the fluorescent tubes has a support member that supports the end portions of the respective fluorescent tubes. In this case, the support member may be formed of one member having a support portion that supports all of the fluorescent tubes, or may be formed of a member having a support portion that supports the fluorescent tubes which are disposed between the boundary and one end portion of the display area as in the item (6). In the case where the fluorescent tubes are supported by the support members as in the item (6), the two support members are combined together to support all of the fluorescent tubes.

Also, for example, in the case where the fluorescent tubes that are arranged as in the item (4) or the item (5) are supported by the support members as in the item (6), a first support portion that supports the fluorescent tubes that are arranged between the boundary and one end portion of the display area is disposed at one of opposed two sides of the support member, and a second support portion that supports the fluorescent tubes that are arranged between the boundary and the other end portion of the display area is disposed at the other opposed side as in the item (7).

Also, the display device having the fluorescent tubes has a reflector usually disposed at the back of the fluorescent tubes. In this situation, the reflector may have a flat bottom surface, or may have convex portions between the respective pairs of the fluorescent tubes as in the item (8).

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

In all of the drawings for explaining the embodiments, parts having the same functions are denoted by identical symbols, and their duplicate description will be omitted.

The present invention is applied to a display device that includes a backlight unit and provides an area high in the brightness and an area low in the brightness on a display area. Under the circumferences, the following description will be given of the structure of a liquid crystal television as an example of the display device to which the present invention is applied.

Figure 1:
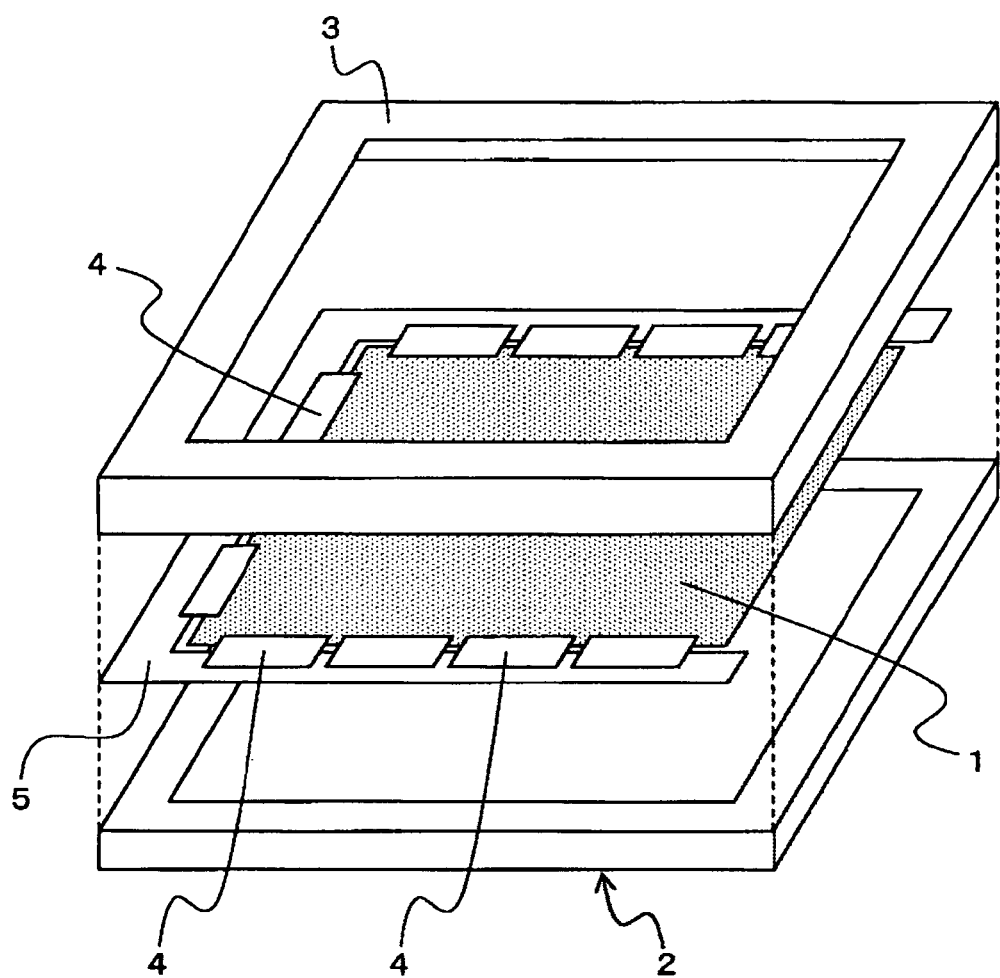
FIG. 1 is a schematic diagram showing the rough structure of a display device according to an embodiment of the present invention, and an exploded perspective view showing the structural example of a display panel and a backlight unit.
Figure 2:
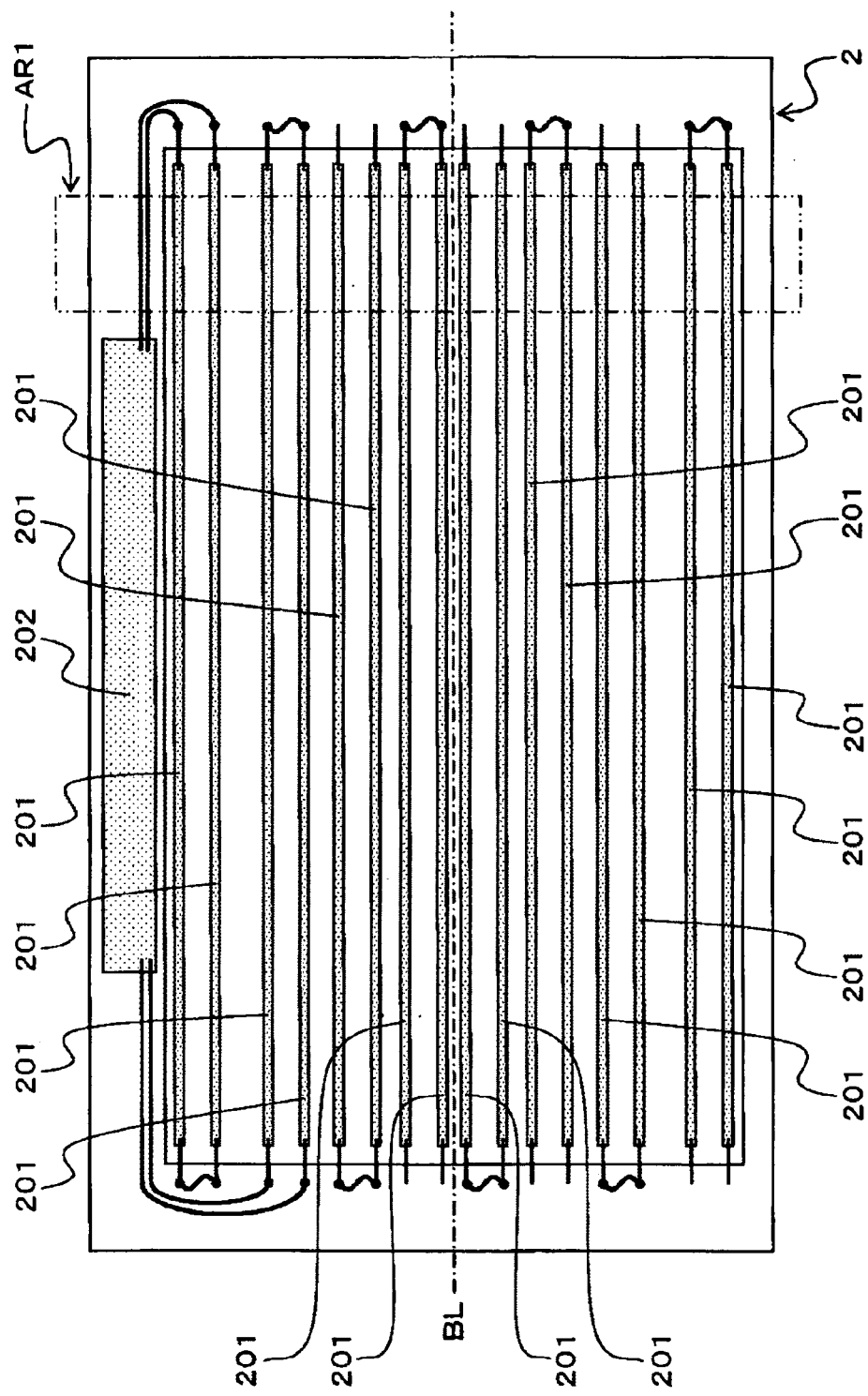
FIG. 2 is a schematic diagram showing the rough structure of the display device according to the embodiment of the present invention, and a front view showing the structural example of the backlight unit.
Figure 3:
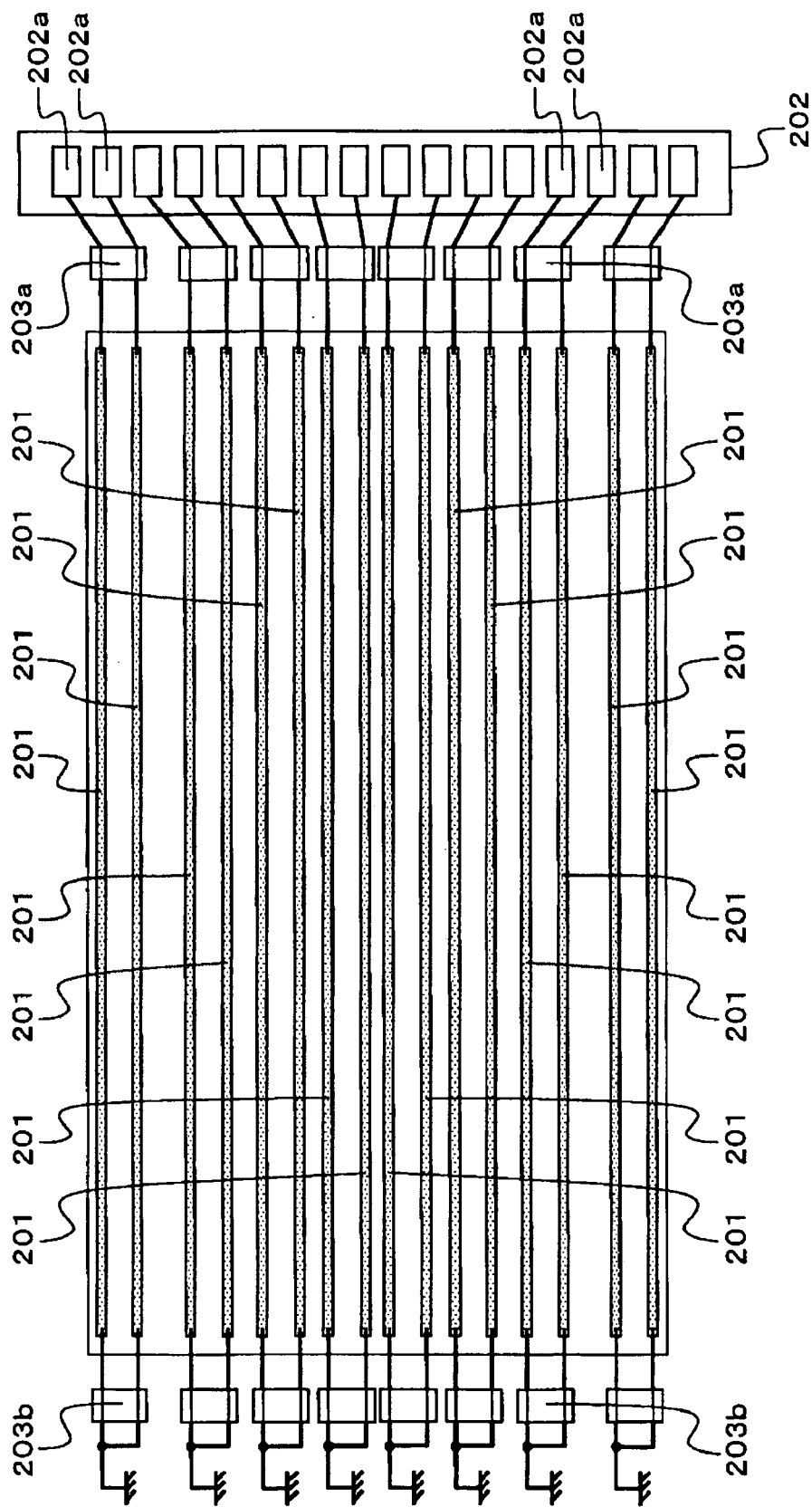
FIG. 3 is a schematic diagram showing the rough structure of the display device according to the embodiment of the present invention, and a schematic circuit block diagram showing an example of a connecting method of the fluorescent tubes.
Figure 4:
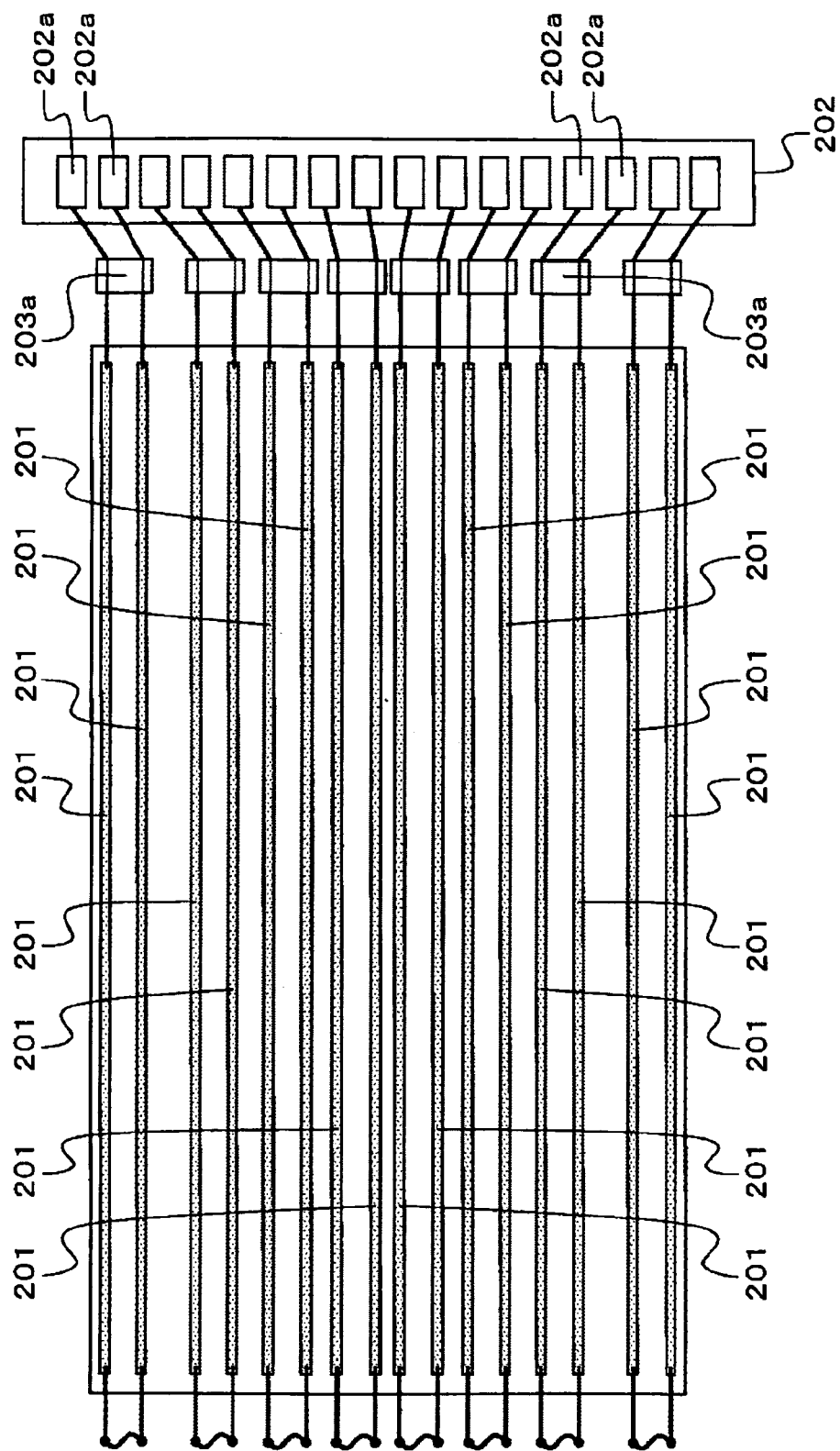
FIG. 4 is a schematic diagram showing the rough structure of the display device according to the embodiment of the present invention, and a schematic circuit block diagram showing another example of a connecting method of the fluorescent tubes.
Figure 5:
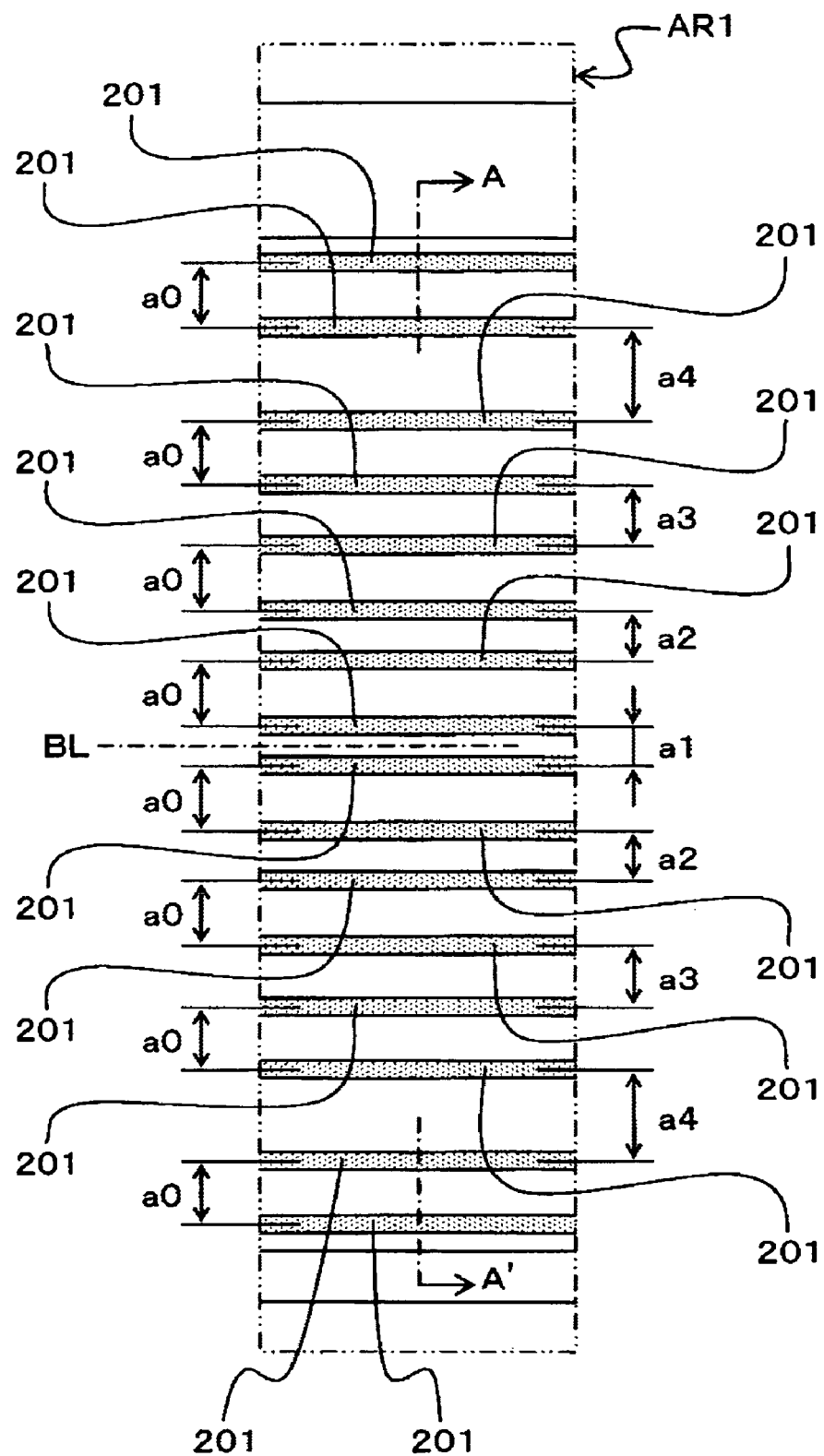
FIG. 5 is a schematic diagram showing the rough structure of the display device according to the embodiment of the present invention, and an enlarged front view showing an area AR1 of FIG. 2.
Figure 6:
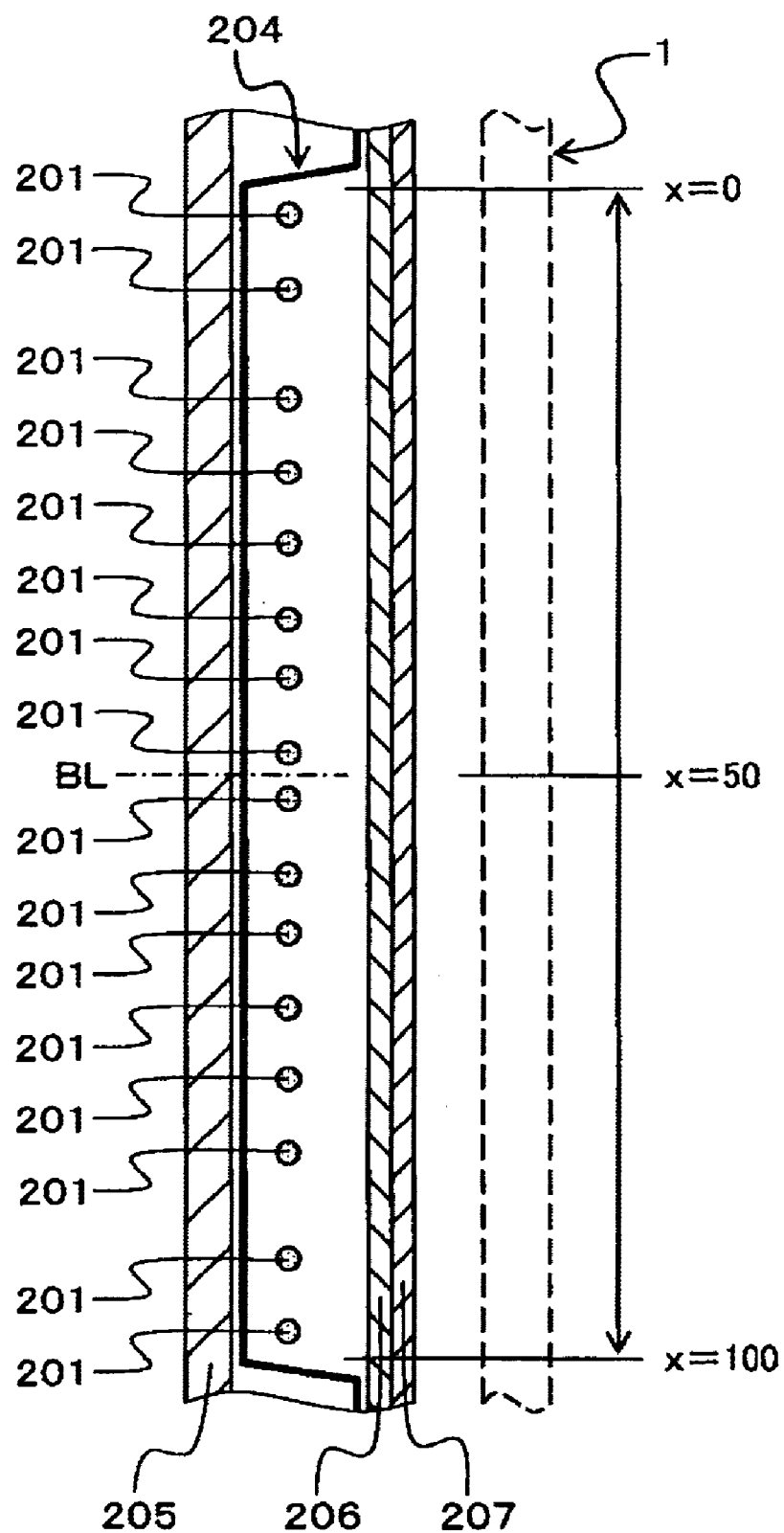
FIG. 6 is a schematic diagram showing the rough structure of the display device according to the embodiment of the present invention, and a cross-sectional view taken along a line A-A' of FIG. 5.

FIGS. 1 to 6 are schematic diagrams showing the rough structure of a display device according to an embodiment of the present invention. FIG. 1 is an exploded perspective view showing the structural example of a display panel and a backlight unit, FIG. 2 is a front view showing the structural example of the backlight unit, FIG. 3 is a schematic circuit block diagram showing an example of a connecting method of the fluorescent tubes, FIG. 4 is a schematic circuit block diagram showing another example of a connecting method of the fluorescent tubes, FIG. 5 is an enlarged front view showing an area AR1 of FIG. 2, and FIG. 6 is a cross-sectional view taken along a line A-A' of FIG. 5.

Referring to FIG. 1, reference numeral 1 denotes a liquid crystal display panel, 2 is a backlight unit, 3 is a frame member (upper frame), 4 is a semiconductor package, and 5 is a printed circuit board. Also, referring to FIGS. 2 to 6, reference numeral 201 denotes fluorescent tubes, 202 is an inverter circuit board, 202a are inverter circuits, 203a and 203b are connectors, 204 is a reflector, 205 is a frame member (lower frame), 206 is an optical diffuser, and 207 is an optical sheet.

The display according to this embodiment is, for example, a display device such as a liquid crystal display, and includes the liquid crystal panel 1, and a backlight unit 2 that is disposed at the back (rear) of the liquid crystal display panel 1 as shown in FIG. 1. In this example, the liquid crystal display panel 1 and the backlight unit 2 are integrally held by the frame member (upper frame) 3.

The liquid crystal display panel 1 is a display panel where a liquid crystal material is sealed between a pair of substrates. For example, TFT elements and pixel electrodes are disposed on one substrate by the pixel basis, and color filters are disposed on another substrate. In the display device (liquid crystal television) of this embodiment, the structure of the liquid crystal display panel 1 may be structured by any one of the conventional various liquid crystal display panels. For that reason, the detailed description of the liquid crystal display panel 1 will be omitted.

Also, in one substrate of the liquid crystal display panel 1, wirings that are connected to the gate electrodes and the drain electrodes of the TFT elements, and the pixel electrodes are led to a substrate end portion and concentrated. The ewirings that are led to the substrate end portion are connected to the wirings of the printed circuit board 5 that is disposed in the outer periphery of the liquid crystal display panel 1 through the semiconductor package 4 such as a TCP or COF into which a driver IC is incorporated.

Also, although not shown, the printed circuit board 5 that is disposed in the outer periphery of the liquid crystal display panel 1 is connected to, for example, another printed circuit board having a circuit such as a timing controller which is disposed at the back of the backlight unit 2. Also, the liquid crystal television according to the first embodiment also includes, for example, a television signal receiving terminal and a signal processor circuit. The structure having the liquid crystal television may be any one of the conventional various liquid crystal television structures. For that reason, the detailed description of other structures will be omitted.

The backlight unit 2 of the liquid crystal television according to this embodiment is a direct type, and, for example, plural fluorescent tubes 201 whose light emission portions are independent from each other are disposed as shown in FIG. 2. The fluorescent tubes 201 are, for example, a cold cathode fluorescent tubes (CFL).

In this example, the respective fluorescent tubes 201 are arranged in such a manner that two adjacent fluorescent tubes 201 constitute one pair. One electrode is connected to the inverter circuit substrate 202, and the other electrode is connected to an electrode of the paired fluorescent tube. In FIG. 2, only the electrodes of two pairs of fluorescent tubes 201 on the upper side of the page are connected to the inverter circuit substrate 202. However, in fact, one side of the electrodes of all the fluorescent tubes 201 is connected to the inverter circuit substrate 202.

Also, in this example, the connection of the respective fluorescent tubes 201 are shown in FIG. 3 in the circuitry fashion, in which one side of the electrode is connected to a different inverter circuit 202a through the connector 203a, respectively. In this case, the other electrode is connected to the electrode of the paired fluorescent tube through the connector 203b, and grounded. Alternatively, the other electrode may not be grounded, and for example, may be connected as shown in FIG. 4. In the case of the circuit structure shown in FIG. 4, the respective paired fluorescent tubes 201 are regarded as U-shaped fluorescent tubes in a pseudo fashion. The operation (control of the inverter circuit) in the case where the electrodes of the two fluorescent tubes are connected is disclosed in, for example, Japanese Patent Laid-Open No. Hei 11(1999)-295731 and U.S. Pat. No. 6,661,181, and therefore its detailed description will be omitted.

Also, in FIG. 3, all of the pairs of fluorescent tubes are grounded, and in FIG. 4, all of those pairs are formed of the pseudo U-shaped fluorescent tubes. Alternatively, those pairs may be combined together, for example, the pairs of fluorescent tubes in the vicinity of the center are formed of the pseudo U-shaped fluorescent tubes, and the pairs of fluorescent tubes at the end portions may be grounded.

Also, the backlight unit 2 is equipped with, for example, a reflector 204 at the back of the fluorescent tubes 201 viewed from the liquid crystal display panel 1 as shown in FIG. 6, and the fluorescent tubes 201 and the reflector 204 are accommodated by the frame member (lower frame) 205. Also, the optical members such as the diffuser 206 and the optical sheet 207 are disposed between the fluorescent tubes 201 and the liquid crystal display panel 1. The structures of the reflector 204 and the lower frame 205 as well as the optical members may be formed of the conventional various structures, and therefore their detailed description will be omitted.

Subsequently, the relationship of the arrangement intervals of the respective fluorescent tubes 201 in the first embodiment will be described with reference to FIG. 5 enlarging the area AR1 in FIG. 2 and FIG. 6 showing a cross-section taken along a line A-A' of FIG. 5. In the backlight unit 2 of the liquid crystal television according to the first embodiment, for example, as shown in FIGS. 5 and 6, the interval of the paired two fluorescent tubes is the same as that of other paired two fluorescent tubes, that is, an interval a0. In this example, it is assumed that the arrangement intervals a1, a2, a3, and a4 of the respective pairs shown in FIG. 5 satisfy a1<a2<a3<a4. In other words, the respective pairs of fluorescent tubes are arranged in such a manner that an interval a1 between two pairs of fluorescent tubes which exist at both sides of a predetermined boundary BL in the arrangement direction is the narrowest, and the intervals between the respective adjacent pairs are broadened further with distance from the boundary. In this example, the arrangement intervals a1, a2, a3, and a4 of the respective pairs are set in such a manner that, when the interval a0 between the two fluorescent tubes in each pair is 1, the interval a1 is set to 0.7 to 1.0, the interval a2 is set to 0.8 to 1.2, the interval a3 is set to 0.9 to 1.2, and the interval a4 is set to 1.0 to 1.3. The arrangement intervals a1, a2, a3, and a4 of the respective pairs satisfy a1<a2<a3<a4 as described above.

Also, in this embodiment, the position of the boundary BL is at the center (x=50) of the vertical direction when the vertical position of the upper end of the display area of the liquid crystal display panel 1 is x=0, and the vertical position of the lower end thereof is x=100, for example, as shown in FIG. 6.

Figure 7:
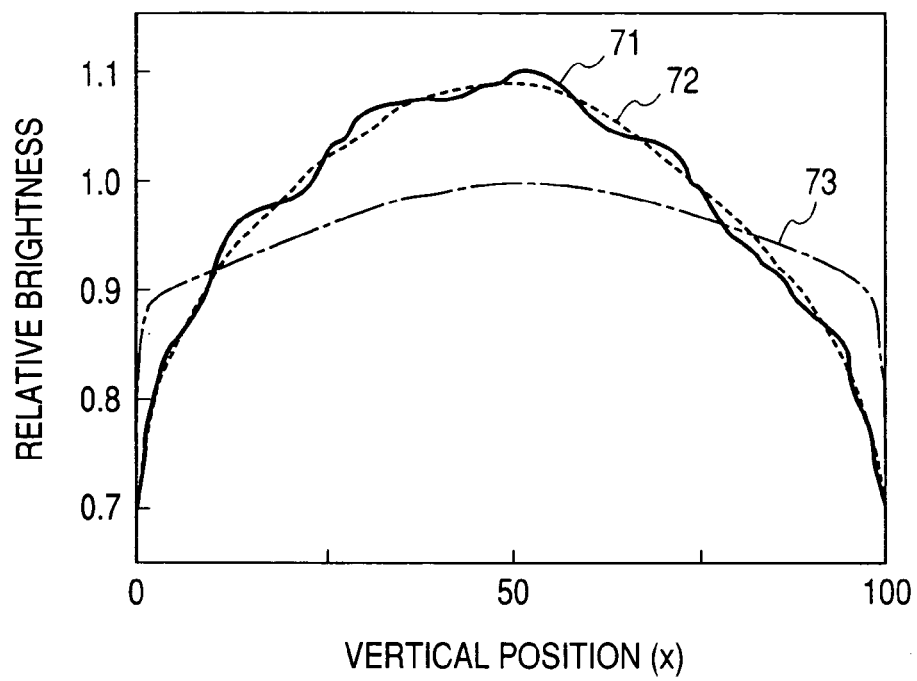
FIG. 7 is a brightness distribution graph showing a relationship between the vertical position of the display area and the relative value of brightness when the fluorescent tubes are arranged as shown in FIGS. 5 and 6.
Figure 8:
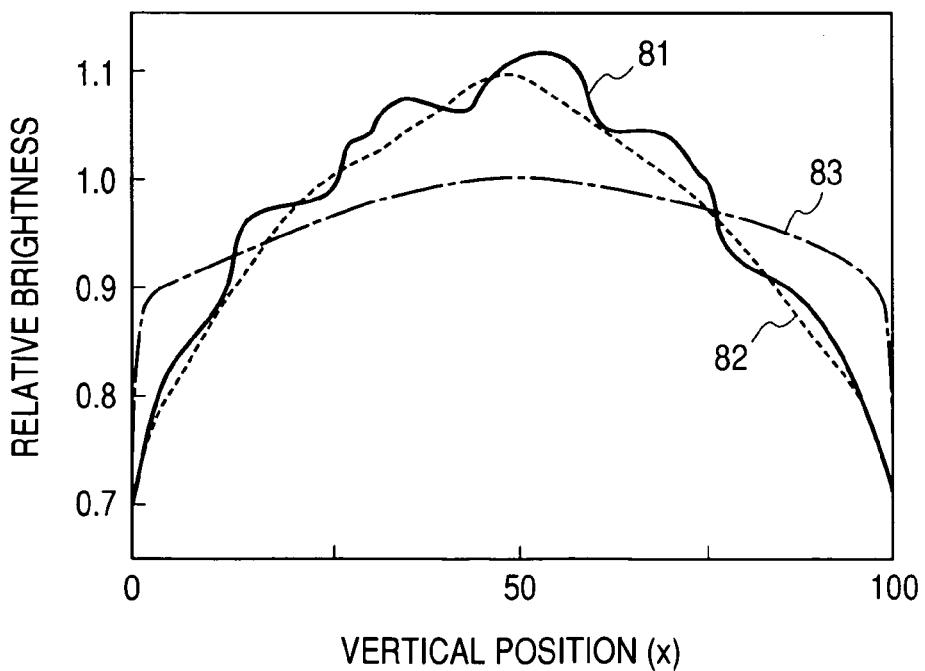
FIG. 8 is a brightness distribution graph showing a relationship between the vertical position of the display area and the relative value of brightness when the respective fluorescent tubes are arranged at irregular pitches for comparison with the display device of this embodiment.

FIGS. 7 and 8 are schematic diagrams for explaining the effect of the display device according to this embodiment. FIG. 7 is a brightness distribution graph showing a relationship between the vertical position of the display area and the relative value of brightness when the fluorescent tubes are arranged as shown in FIGS. 5 and 6. FIG. 8 is a brightness distribution graph showing a relationship between the vertical position of the display area and the relative value of brightness when the respective fluorescent tubes are arranged at irregular pitches for comparison with the display device of this embodiment.

In the display device (liquid crystal television) of this embodiment, the fluorescent tubes 201 whose light emission portions are independent from each other are paired, and the respective pairs are arranged at the irregular intervals as shown in FIGS. 5 and 6. In this case, the respective fluorescent tubes 201 are lighted, the distribution of brightness between the upper end (x=0) and the lower end (x=100) of the vertical positions of the display area shown in FIG. 6 are measured. As a result, for example, the distribution indicated by a solid line 71 or a broken ling 72 in FIG. 7 is obtained. The distribution indicated by the solid line 71 in FIG. 7 is a distribution in the case where the arrangement shown in FIG. 5 and 6 is applied, and the variation in the brightness of the respective fluorescent tubes is large. Also, the distribution indicated by the broken line 72 is a distribution in the case where the arrangement shown in FIG. 5 and 6 is applied, and the variation in the brightness of the respective fluorescent tubes is small. Further, the distribution indicated by the dashed line 73 is a distribution in the case where the fluorescent tubes of the same number as that in the example shown in FIGS. 5 and 6, that is, 16 fluorescent tubes are arranged at regular intervals, and the variation in the brightness of the respective fluorescent tubes is small. Also, the brightness of the respective distributions shown in FIG. 7 is indicated by a relative value with respect to the highest brightness when it is assumed that the highest brightness in the distribution indicated by the dashed line 73 is set as 1.

In the case of the conventional general liquid crystal display device, the luminescent tubes of the backlight unit are arranged in such a manner that the brightness of the display area becomes uniform. For that reason, in the brightness distribution of the vertical position of the display area, a difference in the relative values of the brightness of the respective perpendicular positions of the display area is small as indicated by the dashed line 73 in FIG. 7.

On the other hand, in this embodiment, the pairs of fluorescent tubes 201 are arranged in such a manner that the interval a1 at the center position (x=50) in the vertical direction of the display area is the narrowest, and the intervals are broadened further with distance from the center position. For that reason, in the brightness distribution of the vertical position of the display area, for example, as indicated by the solid line or the broken line 72 in FIG. 7, the brightness of the center position (x=50) at which the arrangement interval of the pairs of fluorescent tubes 201 is the narrowest becomes high, and the brightness of the upper end (x=0) and the lower end (x=100) becomes low. Also, in this example, the arrangement interval a1 of the pairs at the center position (x=50) is made narrower than the intervals a0 between those two fluorescent tubes in each of the pairs. For that reason, the brightness of the center position (x=50) becomes relatively higher than the brightness in the case of the regular intervals indicated by the dashed line 73.

Also, in this embodiment, the fluorescent tubes 201 whose light emission portions are independent from each other are paired, and the respective pairs are arranged at irregular intervals as shown in FIGS. 5 and 6. In order to explain the effects obtained by arranging the pairs of fluorescent tubes at the irregular intervals, for example, when the distribution of brightness in the case where the individual fluorescent tubes are arranged at the irregular intervals without being paired is measured, for example, the distribution shown in FIG. 8 is obtained. The distribution indicated by a solid line 81 in FIG. 8 is a distribution in the case where 16 fluorescent tubes as in the example shown in FIGS. 5 and 6 are arranged at irregular intervals without being paired, and a variation in the brightness of the respective fluorescent tubes is large. Also, the distribution indicated by a dotted line 82 is a distribution in the case where 16 fluorescent tubes as in the example shown in FIGS. 5 and 6 are arranged at irregular intervals without being paired, and a variation in the brightness of the respective fluorescent tubes is small. Further, the distribution indicated by a dotted line 83 is a distribution in the case where the fluorescent tubes of the same number as that in the example shown in FIGS. 5 and 6, that is, 16 fluorescent tubes are arranged at irregular intervals, and a variation in the brightness of the respective fluorescent tubes is small. Also, the brightness of the respective distributions shown in FIG. 8 is indicated by a relative value with respect to the highest brightness when it is assumed that the highest brightness in the distribution indicated by the dashed line 83 is set as 1.

As described above, even in the case where the fluorescent tubes 201 are arranged without being paired in such a manner that the interval of the center (x=50) of the vertical position of the display area is the narrowest, and the intervals are broadened further with distance from the center position, as indicated by the solid line and the broken line in FIG. 8, the brightness of the center (x=50) of the vertical position can be made high, and the brightness of the upper end (x=0) and the lower end (x=100) can be made low.

However, in the case where the fluorescent tubes are not paired, when a variation in the brightness of the individual fluorescent tubes 201 is large, as indicated by a solid line in FIG. 8, the brightness unevenness is larger than that in the case where the variation in the individual fluorescent tubes is small.

On the other hand, in the case where the fluorescent tubes 201 are paired as in this embodiment, as shown in FIG. 7, when the variation in the brightness of the individual fluorescent tubes is large, the unevenness of brightness is remarkable as compared with the case in which the variation in the individual fluorescent tubes is small. However, as compared with the case where the fluorescent tubes are not paired (the distribution indicated by the solid line in FIG. 8), the unevenness of brightness is small. This may be because the variation in the brightness of the paired two fluorescent tubes is averaged, and an influence of the variation in the brightness of the individual fluorescent tubes on the brightness distribution is reduced.

As described above, according to the display device of this embodiment, it is possible to increase the brightness of the center of the vertical position of the display area, and decrease the brightness of the upper end and the lower end of the display area. Also, since the fluorescent tubes 201 whose light emission portions are independent from each other are paired, even in the case where the variation in the individual fluorescent tubes is large, the unevenness of brightness can be reduced. Furthermore, the narrowest interval a1 among the arrangement intervals of the respective pairs is made narrower than the interval a0 between the two fluorescent tubes in each of the pairs, thereby making it possible to increase the relative value of the brightness of the center of the vertical position of the display area.

Also, in the display device according to this embodiment, it is possible to increase the brightness of the center of the vertical position of the display area and to decrease the brightness of the upper end and the lower end of the display area. For that reason, for example, it is possible that the brightness distribution of the liquid crystal television easily approach the brightness distribution of the CRT television.

Figure 9:
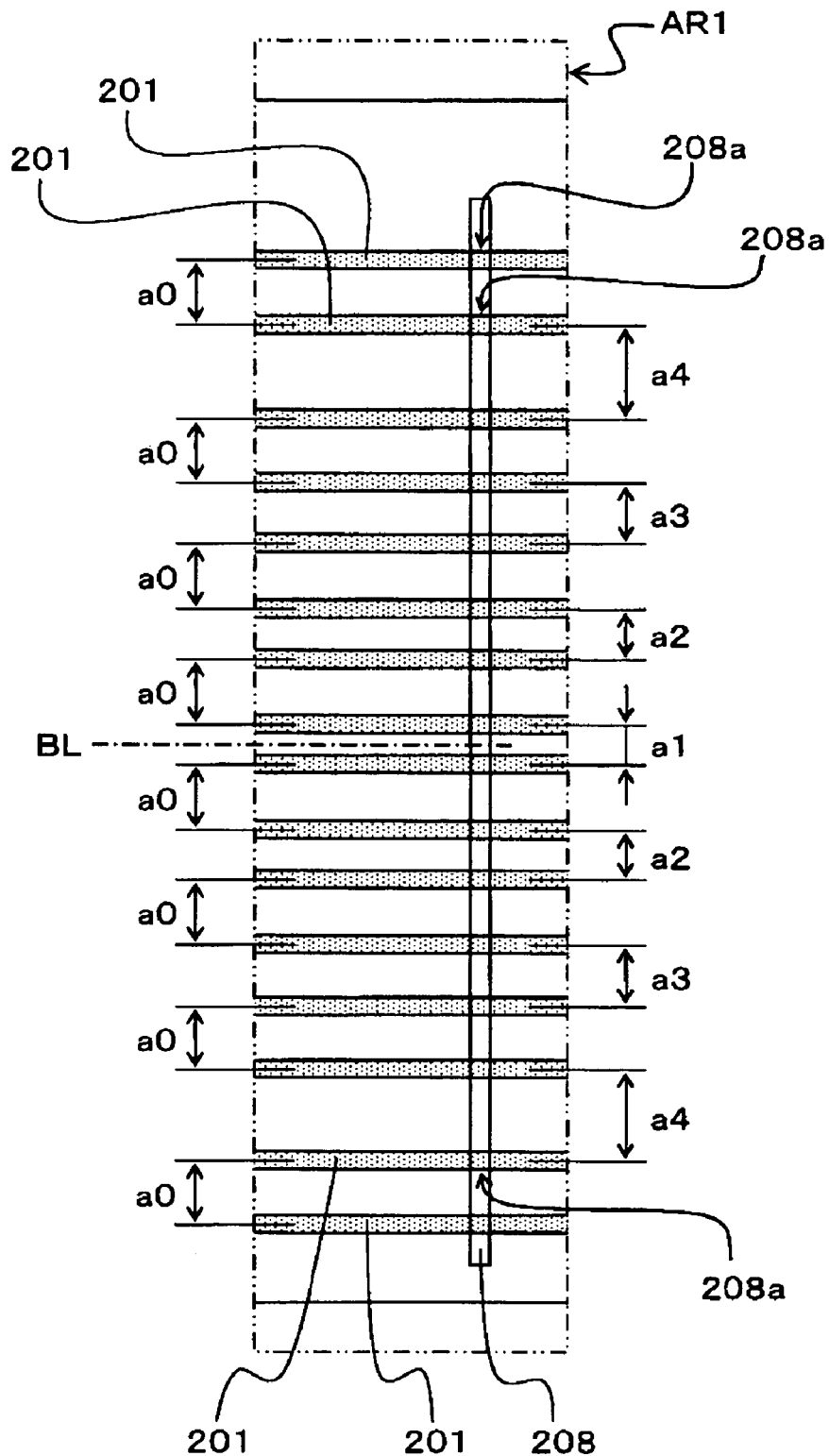
FIG. 9 is a schematic diagram for explaining another feature in the display device of this embodiment, and an enlarged plan view showing an area corresponding to the area AR1 of FIG. 2.
Figure 10:
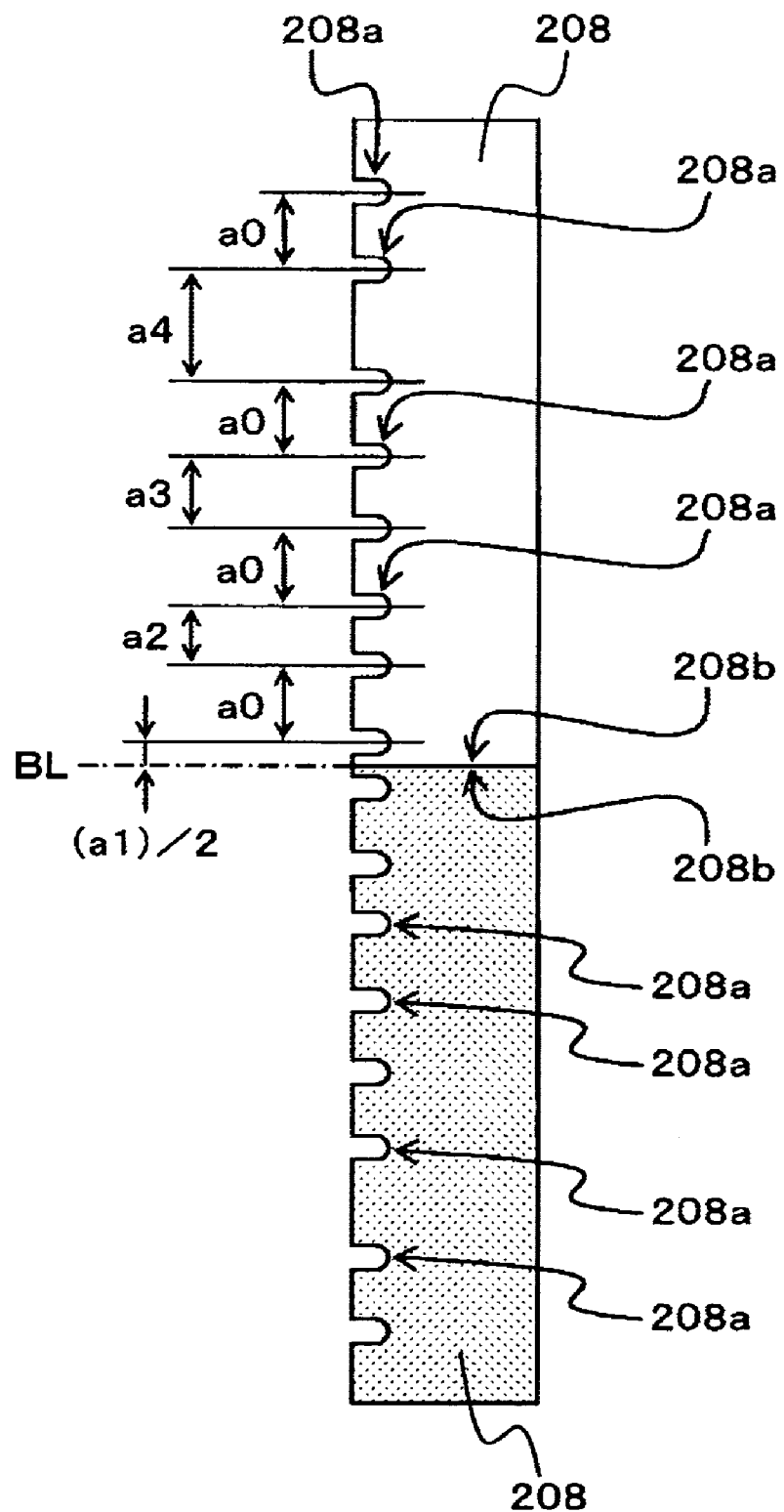
FIG. 10 is a schematic diagram for explaining another feature in the display device of this embodiment, and a side view showing a structural example of the support member shown in FIG. 9.
Figure 11:
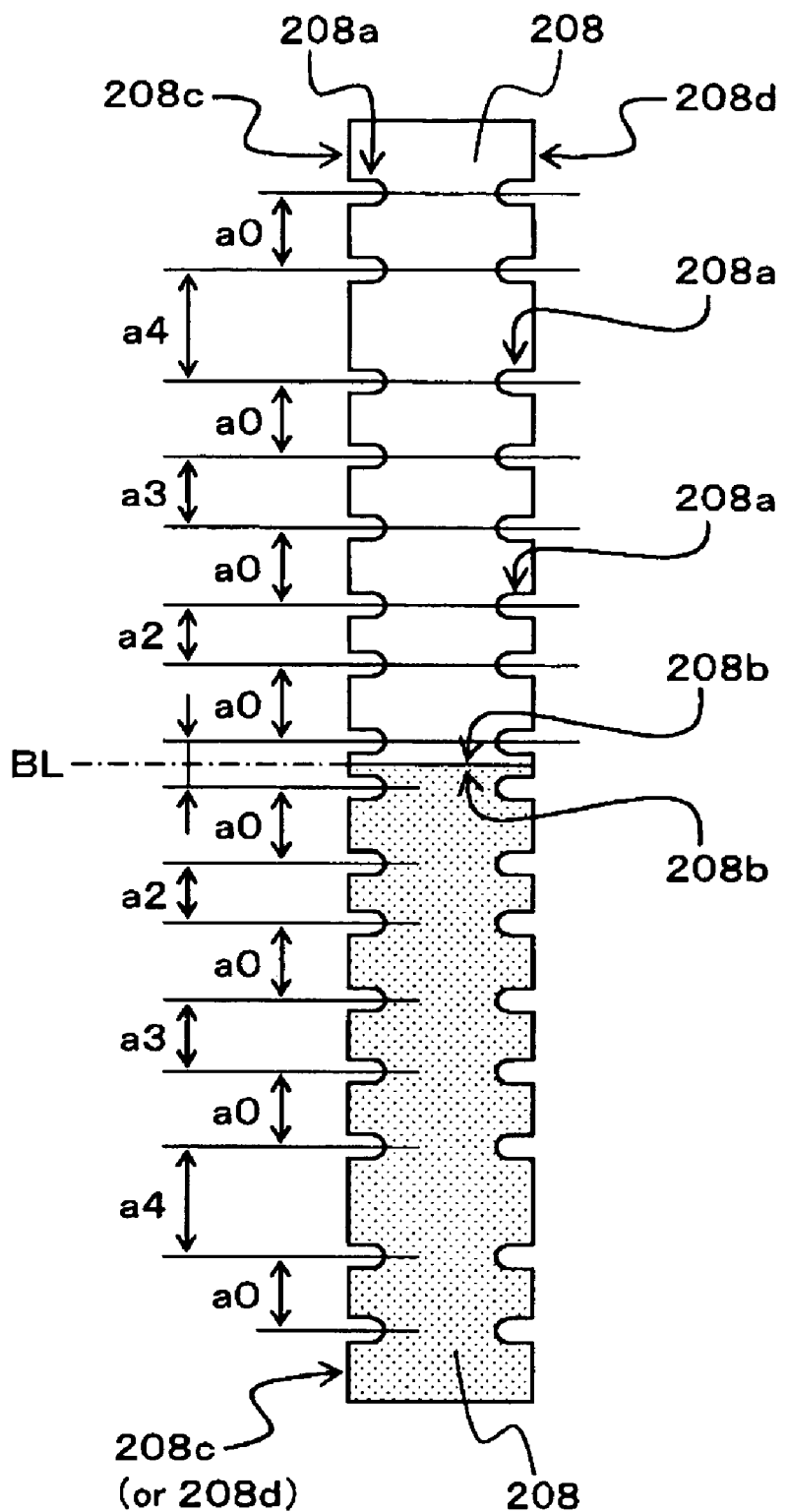
FIG. 11 is a schematic diagram for explaining another feature in the display device of this embodiment, and a side view showing another structural example of the support member shown in FIG. 9.

FIGS. 9 to 11 are schematic diagrams for explaining other features in the display device according to this embodiment. FIG. 9 is an enlarged plan view showing an area corresponding to the area AR1 of FIG. 2, FIG. 10 is a side view showing a structural example of the support member shown in FIG. 9, and FIG. 11 is a side view showing another structural example of the support member.

The display device according to this embodiment is, for example, a display device that is large in the display area as with the liquid crystal television. In this case, the respective fluorescent tubes 201 are, for example, supported by the support member so as to keep a constant arrangement interval or a constant distance from the optical members. The support member is formed of, for example, a member that supports the end portion of the fluorescent tubes 201 which is called "side mold", and a member that supports the vicinity of the center of the fluorescent tubes 201 which is called "pin mold". In this case, the size mold 208 is, for example, formed of a plate support member that extends in the arrangement direction of the fluorescent tubes as shown in FIG. 9. The plate support member is equipped with support portions 208a that are notches (grooves) or through-holes.

In the case of the display device according to this embodiment, the side mold 208 may provide, for example, the support portions 208a that support all of the fluorescent tubes 201 on one plate member. However, in the case of the first embodiment, the respective fluorescent tubes 201 are disposed in such a manner that the upper and lower portions are axisymmetrical with each other with the center (x=50) of the vertical position of the display area as the boundary BL, as shown in FIGS. 5 and 6. For that reason, for example, as shown in FIG. 10, there are provided two support members 208 having the support portions 208a that support the fluorescent tubes 201 that are disposed between the boundary BL and the upper end of the display area, and those support members can be combined together to support all of the fluorescent tubes. In this example, for example, as shown in FIG. 10, a first support portions 208a is disposed at a position of a distance (a1)/2 from the end surface 208b at the boundary BL side, and the subsequent support portions 208a are disposed at positions of the interval a0, the interval a2, the interval a0, the interval a3, the interval a0, the interval a4, and the interval a0 in the stated order. With this structure, the end surfaces 208b of the two support members 208 face each other, thereby making it possible to support the fluorescent tubes 201 disposed as shown in FIGS. 5 and 6.

Also, in the example shown in FIG. 10, the support portion 208a is disposed on only one side 208c of the support member 208. However, for example, as shown in FIG. 11, the support portion 208a may be disposed on the opposed two sides 208c and 208d.

As described above, since two support members that have been divided into two pieces are combined together, an influence of the expansion and contraction of the member due to the temperature can be reduced by half as compared with the case in which one large member is used, thereby making it possible to prevent an unnecessary stress from being applied to the supported fluorescent tubes. Also, the parts that have been molded by one die are commonly used, thereby making it possible to prevent the kinds of parts from increasing in the number. In the structure shown in FIG. 10, the parts at the lower side are arranged so that the parts at the upper side are folded, thereby making it possible to use the parts commonly. Also, in the structure shown in FIG. 11, even if the parts are used as in the case of FIG. 10, the parts at the upper side may be reversed by 180 degrees as the parts at the lower side.

Figure 12:
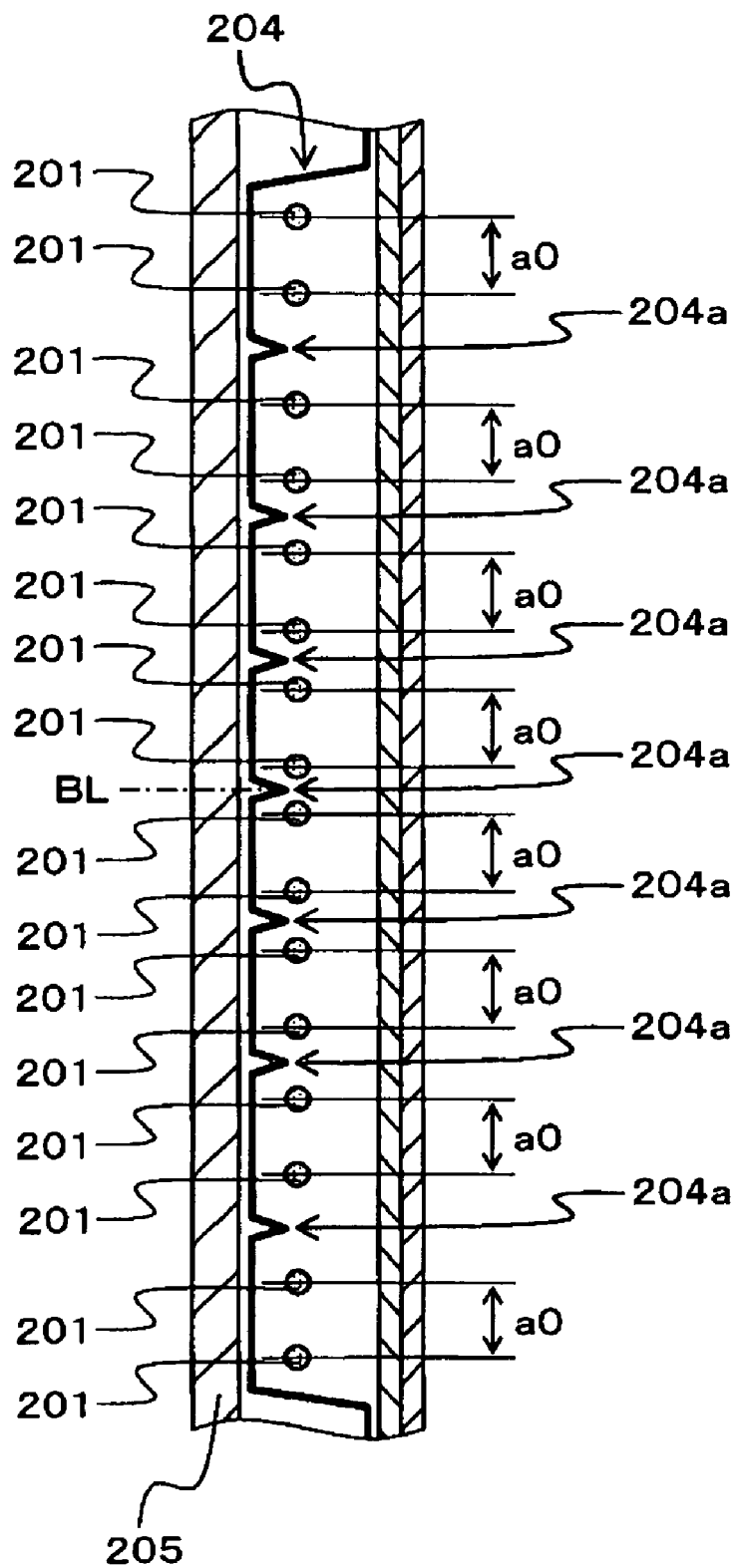
FIG. 12 is a schematic diagram for explaining a modified example of the display device according to this embodiment, and a cross-sectional view showing a modified example of the structure of a reflector.
Figure 13:
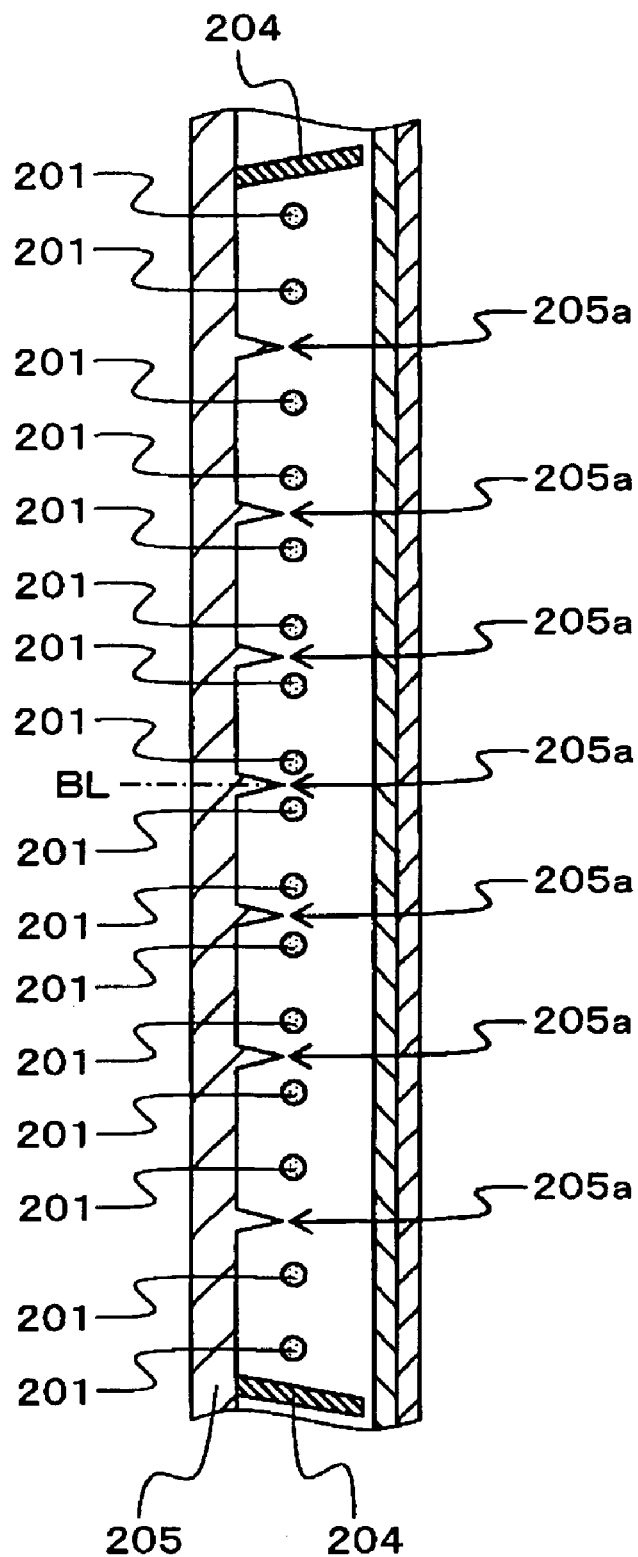
FIG. 13 is a schematic diagram for explaining a modified example of the display device according to this embodiment, and a cross-sectional view showing a modified example of the structure of a reflector.

FIGS. 12 and 13 are schematic diagrams for explaining modified examples of the display device according to this embodiment, and cross-sectional views showing the modified examples of the structure of the reflector, respectively. FIGS. 12 and 13 show the same cross-sections as the cross-section of the backlight unit shown in FIG. 6.

In the display device according to this embodiment, the reflector 204 disposed in the backlight unit 2 is not limited to, for example, the reflector 204 having the flat bottom surface shown in FIG. 6, but can be formed of reflectors of various configurations. As an example of another configuration of the reflector 204, for example, as shown in FIG. 12, there is a reflector 204 having convex portions 204a between the respective pairs of the fluorescent tubes 201 on the bottom surface. Also, as shown in FIGS. 6 and 12, the reflector 204 having the bottom surface may be replaced with an annular reflector 204 having the frame member (lower frame) 204 as the reflection bottom surface, for example, as shown in FIG. 13. In this example, for example, as shown in FIG. 13, convex portions 205a may be disposed on the frame member 205, or the frame member 205 may be flat.

Also, in this embodiment, when the pairs of the fluorescent tubes 201 are disposed at irregular intervals, as shown in FIGS. 5 and 6, the position having the narrowest interval (boundary BL) is in the center (x=50) of the vertical position of the display area. However, in the display device according to this embodiment, the position having the narrowest interval (boundary BL) may be deviated from the center of the vertical position of the display area.

Figure 14:
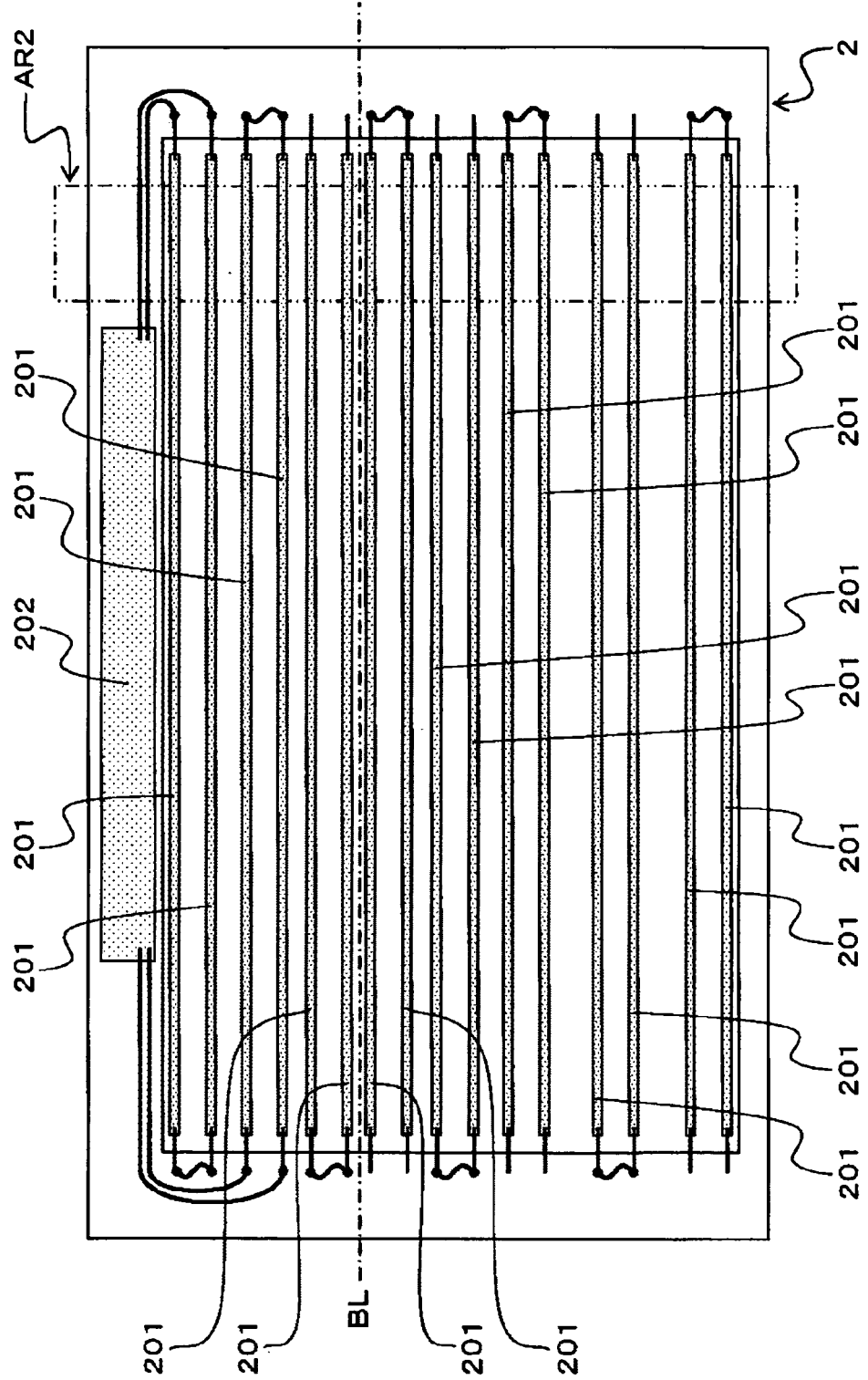
FIG. 14 is a schematic diagram for explaining an applied example of the embodiment, and a plan view showing a structural example of the entire backlight unit.
Figure 15:
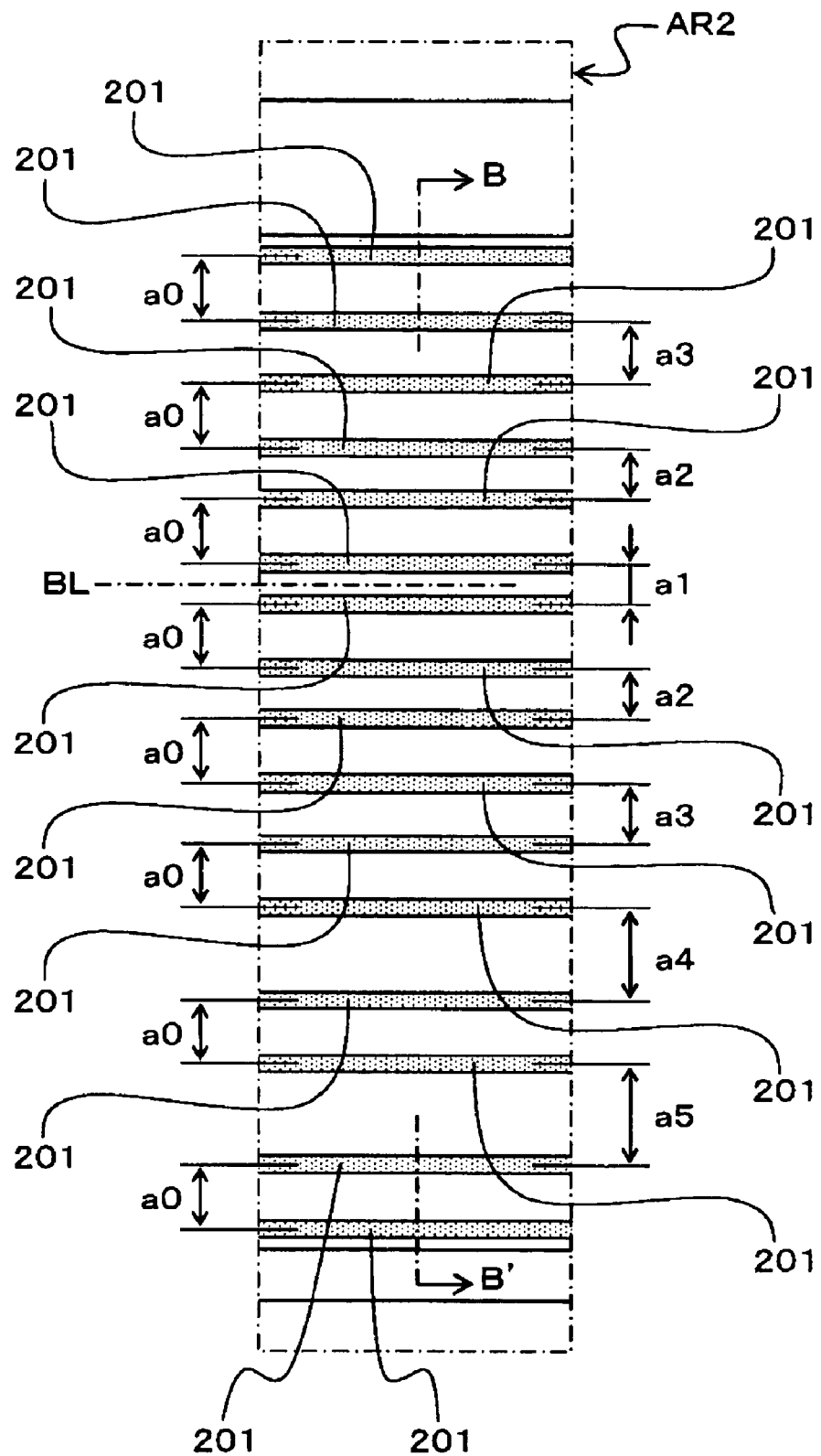
FIG. 15 is a schematic diagram for explaining an applied example of the embodiment, and an enlarged plan view showing an area AR2 of FIG. 14.
Figure 16:
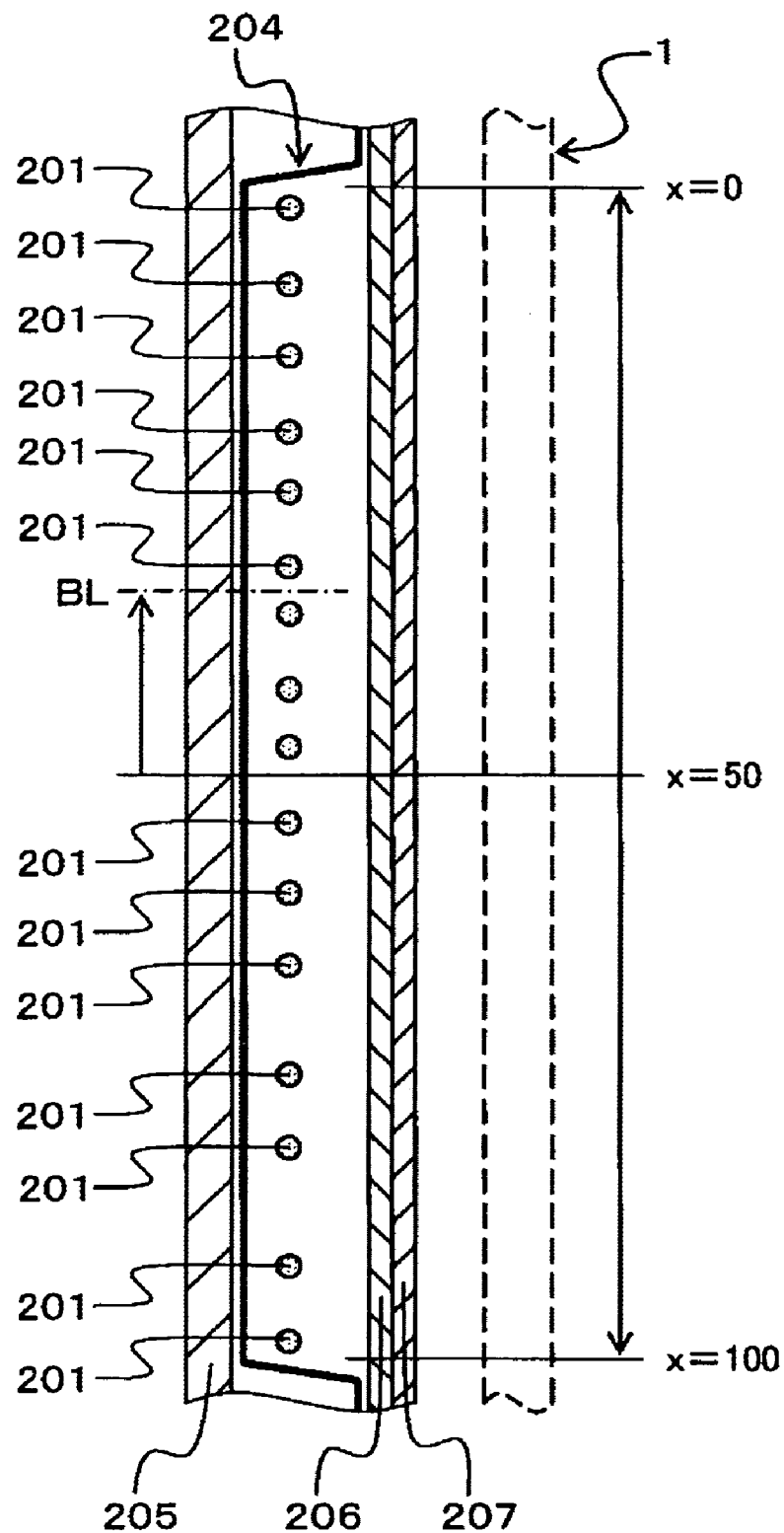
FIG. 16 is a schematic diagram for explaining an applied example of the embodiment, and a cross-sectional view taken along a line B-B' of FIG. 15.
Figure 17:
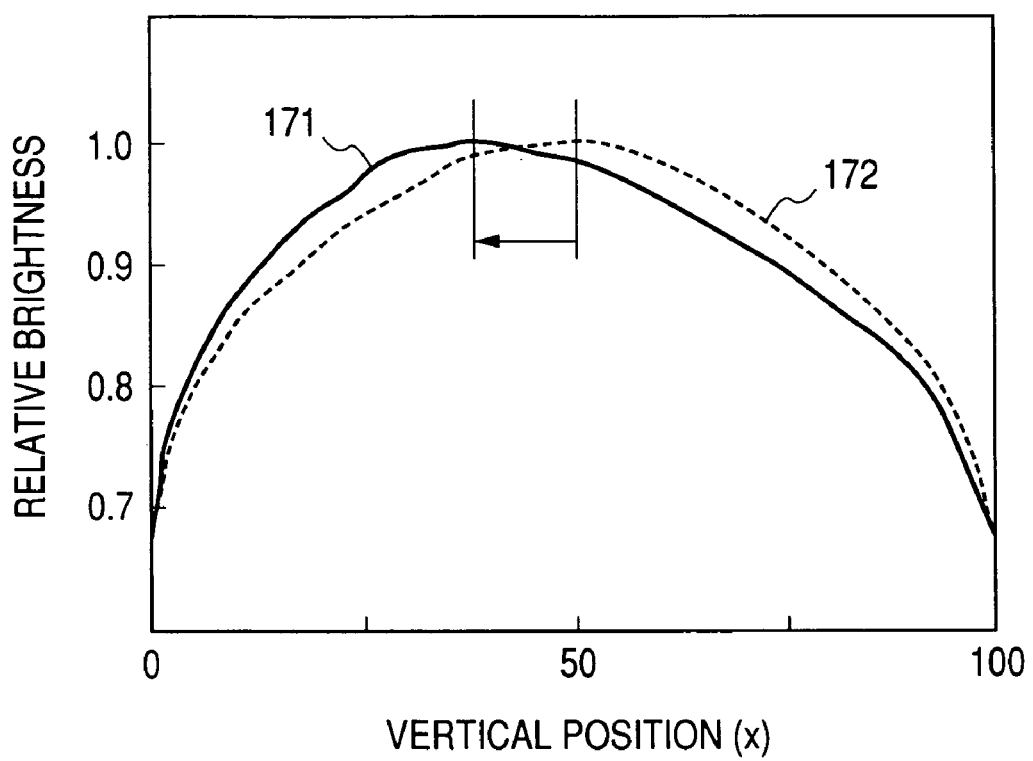
FIG. 17 is a schematic diagram for explaining an applied example of the embodiment, and a brightness distribution graph showing a relationship between the vertical position of the display area and the relative value of brightness when the fluorescent tubes are arranged as shown in FIGS. 5 and 6.

FIGS. 14 to 17 are schematic diagrams for explaining the applied examples of the embodiment. FIG. 14 is a plan view showing a structural example of the entire backlight unit, FIG. 15 is an enlarged plan view showing an area AR2 of FIG. 14, FIG. 16 is a cross-sectional view taken along a line B-B' of FIG. 15, and FIG. 17 is a brightness distribution graph showing a relationship between the vertical position of the display area and the relative value of brightness when the fluorescent tubes are arranged as shown in FIGS. 5 and 6.

The feature of the display device according to the present invention resides in that when the pairs of the fluorescent tubes 201 are disposed at irregular intervals, the arrangement interval of the pairs at a position (peak position) where the brightness is intended to be the highest in the display area is made narrowest, and the arrangement intervals of the pairs are broadened further with distance from the peak position. For that reason, the position having the narrowest interval (boundary BL) may be deviated from the center (x=50) of the vertical position of the display area.

As an example of the case in which the position having the narrowest interval (boundary BL) among the arrangement intervals of the pairs of the fluorescent tubes 201 is deviated from the center (x=50) of the vertical position of the display area, there is a case in which the fluorescent tubes 201 are disposed as shown in FIG. 14. In the example of FIG. 14, the respective fluorescent tubes 201 are disposed in such a manner that the two adjacent fluorescent tubes are coupled as one pair, and one electrode of the fluorescent tube 201 is connected to the inverter circuit substrate 202, and the other electrode is connected to the electrode of the paired fluorescent tube. Also, in FIG. 14, only the electrodes of two pairs of fluorescent tubes 201 on the upper side of the paper are connected to the inverter circuit substrate 202. However, in fact, one electrode of each of the fluorescent tubes 201 is connected to the inverter circuit substrate 202.

The relationship of the arrangement intervals of the respective fluorescent tubes 201 of the backlight unit 2 shown in FIG. 14 will be described with reference to FIG. 15 showing the enlarged view of the area AR2 shown in FIG. 14, and FIG. 16 showing a cross-section taken along a line B-B' of FIG. 15. First, it is assumed that the intervals between the fluorescent tubes 201 in the respective pairs are identical with each other, that is, a0. Also, in this case, the arrangement intervals a1, a2, a3, a4, and a5 of the respective pairs shown in FIG. 5 satisfy a1<a2<a3<a4<a5. That is, in the respective pairs, the interval a1 of the two pairs at both ends of the predetermined boundary BL in the arrangement direction is the narrowest, and the intervals are broadened further with distance from the boundary BL.

Also, it is assumed that the position (boundary BL) of the narrowest interval a1 is at the upper side of the center (x=50) when the vertical position of the upper end of the display area of the liquid crystal display panel 1 is x=0, and the vertical position of the lower end thereof is x=100. Also, in this situation, three pairs of fluorescent tubes are disposed between the boundary BL and the upper end of the display area, and five pairs of fluorescent tubes are disposed between the boundary BL and the lower end of the display area.

When the pairs of fluorescent tubes 201 are arranged at the intervals shown in FIGS. 15 and 16, and the distribution of the brightness between the upper end (x=0) and the lower end (x=100) of the vertical position in the display area shown in FIG. 16 is measured, for example, distributions shown in FIG. 17 is obtained. A distribution indicated by a solid line 171 in FIG. 17 is a distribution at the arrangement shown in FIGS. 15 and 16, and a distribution indicated by a solid line 172 is a distribution at the arrangement shown in FIGS. 5 and 6.

In the case where the respective pairs are arranged at the intervals shown in FIGS. 15 and 16, the position (boundary BL) of the narrowest interval is at the upper end side of the center (x=50) of the vertical position in the display area. For that reason, a peak of the brightness is deviated to the upper end (x=0) side from the center (x=50) of the vertical position as indicated by a solid line in FIG. 17. Also, although not shown in the figure, conversely, when the pairs of fluorescent tubes 201 are disposed so that the position (boundary BL) of the narrowest interval is at the lower end side of the center (x=50) of the vertical position in the display area, a peak of the brightness is deviated to the lower end (x=100) side from the center (x=50) of the vertical position. For that reason, the brightness of an arbitrary vertical position in the display area can be most increased by adjusting the position (boundary BL) of the narrowest interval when the pairs of fluorescent tubes 201 are arranged.

Also, in the case where the pairs of fluorescent tubes 201 are arranged so that the position (boundary BL) of the narrowest interval is in the center (x=50) of the vertical position in the display area, a heat occurring at the time of lighting the fluorescent tubes is accumulated in the upper end (x=0) of the display area. The light emission efficiency of the fluorescent tubes depends on the temperature, and when the temperature is too high, the efficiency is deteriorated, that is, the display area becomes relatively dark. For that reason, when an operating time becomes long, the upper end side of the display area may become darker than the lower end side due to a temperature difference between the upper end and the lower end which is attributable to the heating of the fluorescent tubes. Under the circumstances, for example, when the arrangement shown in FIGS. 15 and 16 is taken, since the interval of the pairs at the upper end side is narrower than the interval of the pairs at the lower end side, an influence of the heat on the brightness can be reduced, thereby making it possible to reduce a difference in the brightness between the upper end and the lower end.

Figure 18:
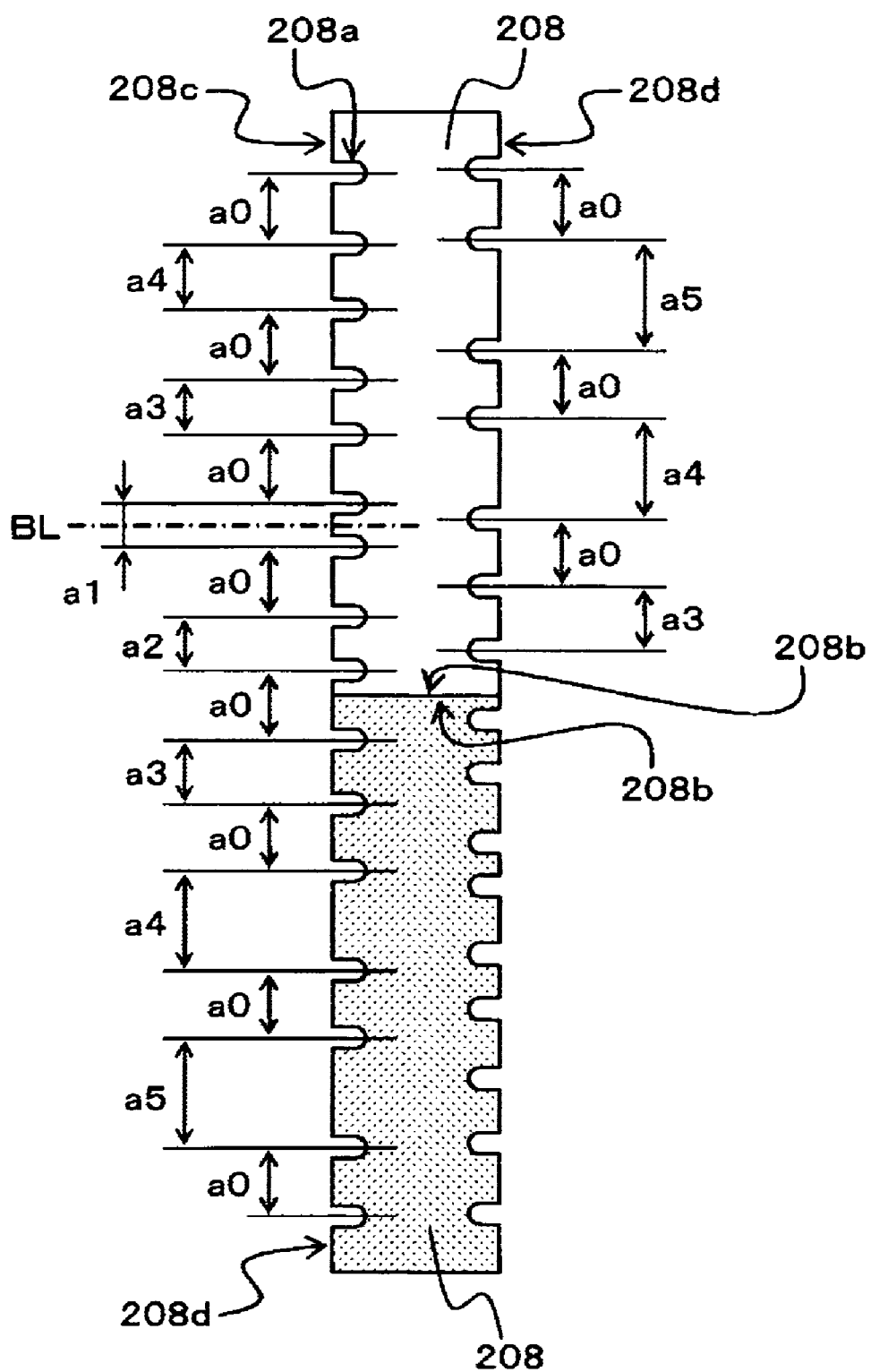
FIG. 18 is a schematic side view showing a structural example of a side mold in the arrangement shown in FIGS. 14 to 16.

FIG. 18 is a schematic side view showing the structural example of a side mold in the arrangement shown in FIGS. 14 to 16.

Likewise, in the case where the pairs of fluorescent tubes are arranged as shown in FIGS. 14 to 16, the end portions of the fluorescent tubes are supported by the side mold 208. In this case, for example, the side mold 208 may provide the support portions 208a that support all of the fluorescent tubes 201 on a single plate member, or two support members may be combined together.

In the case where the two support members are combined together, for example, as shown in FIG. 18, support portions 208a that support the fluorescent tubes 201 which are disposed between the center (x=50) of the vertical position in the display area and the upper end of the display area are provided on one side 208c of the opposed two sides 208c and 208d of the support member. Then, support portions 208a that support the fluorescent tubes 201 which are disposed between the center (x=50) of the vertical position in the display area and the lower end of the display area are provided on the other side 208d of the opposed two sides. In this case, when the sum of the distances between the side 208b that allows the two support members 208 to face each other and the nearest support member 208a becomes a0 in the opposed two sides 208c and 208d, the fluorescent tubes 201 that are arranged as shown in FIGS. 15 and 16 can be supported. With this structure, since the upper-side member is reversed by 180 degrees so as to be used as the lower-side member, a reduction in the kinds of members and a reduction in the die costs are realized as in the example shown in FIG. 11. In addition, in the case of the structure shown in FIG. 18, because the positions of the recesses of the member are displaced in the widthwise direction of the member, a degree of locally thinning the thickness of the member is reduced, thereby making it possible to improve the strength of the member as the support member.

In the above embodiment, all of the intervals of the paired fluorescent tubes are identical with each other. However, the present invention is not limited to this structure, and the intervals of the paired fluorescent tubes may be different from each other. When the arrangement intervals of the respective pairs are narrow in the vicinity of the predetermined boundary, an object of the present invention can be achieved.

Figure 19:
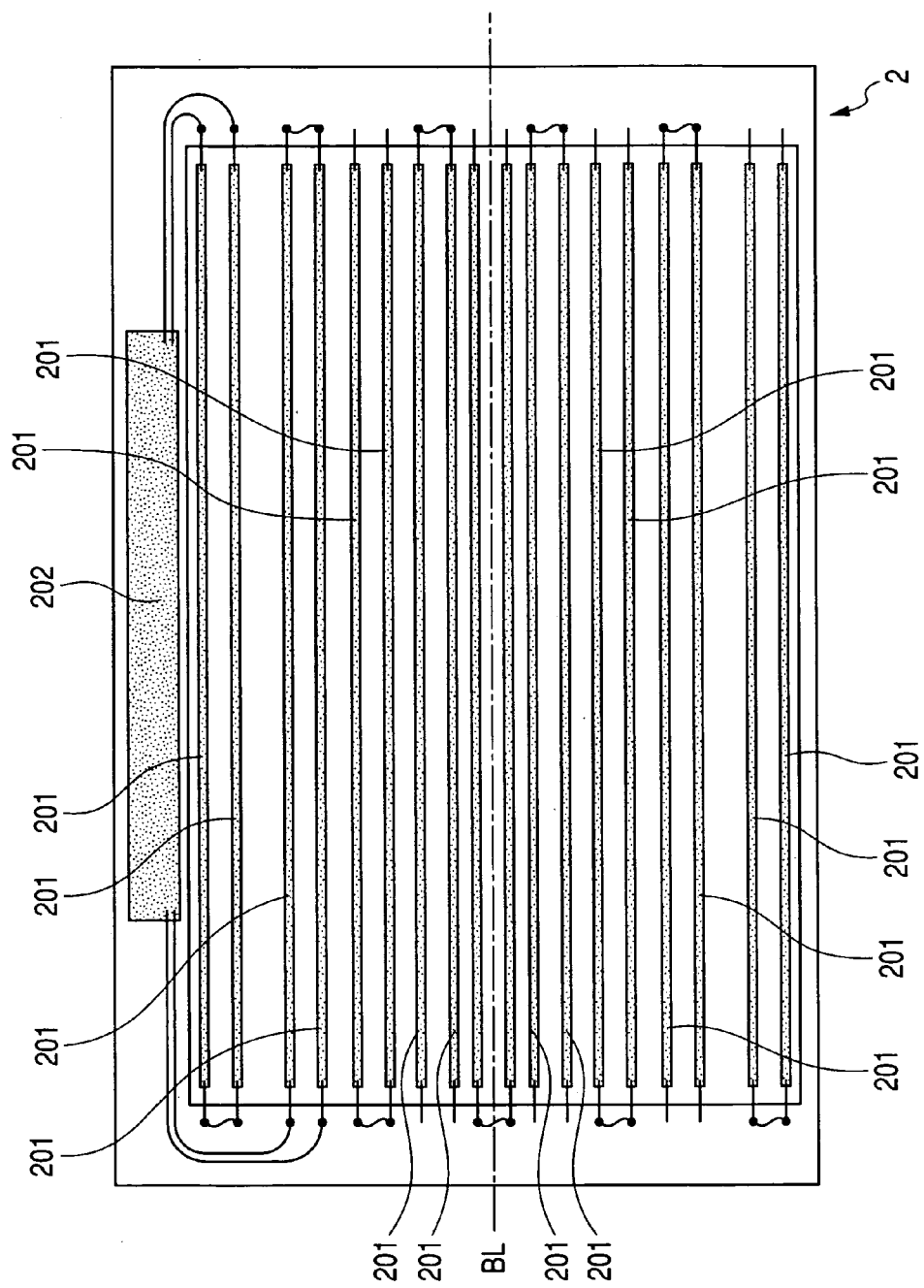
FIG. 19 is a schematic diagram showing another embodiment of the present invention.

FIG. 19 shows still another embodiment of the present invention. In this embodiment, the center of the paired fluorescent tubes substantially coincides with the center of the screen. In this case, the odd-numbered fluorescent tubes exist at both sides of the center line of the screen. Likewise, in this case, the object of the present invention can be achieved by making the arrangement intervals of the respective pairs smallest in the vicinity of the center of the screen.

The present invention has been described with reference to the embodiments. However, the present invention is not limited to the above embodiments, and can be variously modified within the degree that does not deviate the summary of the present invention.

For example, in the above embodiment, the liquid crystal television is exemplified as the display device. However, the present invention is not limited to this example, and the configuration of the present invention can be applied to the same structure, that is, a case in which an area high in the brightness and an area low in the brightness are provided in various display devices having the direct backlight unit 2.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A display device comprising:
    a plurality of pairs of fluorescent tubes arranged at the back of a display area of a display panel,
    wherein each fluorescent tube in each pair of fluorescent tubes includes a light emission portion separate from the light emission portion of any other fluorescent tube, and said fluorescent tubes paired in each pair are connected in series having an electrical connection connecting one electrode of a first fluorescent tube to an electrode of a second fluorescent tube of the pair of fluorescent tubes;
    wherein another electrode of said first fluorescent tube is connected to a first inverter circuit, and another electrode of said second fluorescent tube is connected to a second inverter circuit;
    wherein said pairs of fluorescent tubes are arranged at irregular intervals;
    wherein an arrangement interval between said fluorescent tubes paired in one pair of fluorescent tubes is the same as that of every other pair of fluorescent tubes, and
    wherein the arrangement intervals of the respective pairs of fluorescent tubes are narrowest in the vicinity of a predetermined boundary in the arrangement direction.

2. The display device according to claim 1, wherein the arrangement intervals of the respective pairs of fluorescent tubes are narrowest in the vicinity of a predetermined boundary in the arrangement direction, and the intervals are broadened further with distance from the boundary.

3. The display device according to claim 1, wherein the narrowest interval among the arrangement intervals of the respective pairs of fluorescent tubes is narrower than the arrangement interval of the paired fluorescent tubes.

4. The display device according to claim 1, wherein the boundary is in the center of the display area of the display panel.

5. The display device according to claim 1, wherein the number of pairs of fluorescent tubes arranged at both sides of the boundary is different from each other.

6. The display device according to claim 5, wherein the number of pairs of fluorescent tubes which are arranged between the boundary and an upper side of the display area is smaller than that between the boundary and a lower side of the display area.

7. The display device according to claim 1, further comprising a support member that supports end portions of the respective fluorescent tubes,
    wherein the support member has a first portion that supports the fluorescent tubes which are arranged between the boundary and one end portion of the display area at one of opposed two sides, and a second portion that is capable of supporting the fluorescent tubes which are arranged between the boundary and the other end portion of the display area at another side, and
    wherein the first portion and the second portion pass through the center of the two sides, and are axisymmetrical with respect to a line that is in parallel to the two sides.

8. The display device according to claim 1, wherein said pairs of fluorescent tubes are not connected in series.

9. The display device according to claim 1, wherein said pairs of fluorescent tubes are connected in parallel.

10. The display device according to claim 1, wherein the fluorescent tubes of each of said pairs of fluorescent tubes are arranged substantially in parallel to one another.

11. A display device comprising:
    a plurality of pairs of fluorescent tubes arranged at the back of a display area of a display panel,
    wherein each fluorescent tube in each pair of fluorescent tubes includes a light emission portion separate from the light emission portion of any other fluorescent tube, and said fluorescent tubes paired in each pair are connected in series having an electrical connection connecting one electrode of a first fluorescent tube to an electrode of a second fluorescent tube of the pair of fluorescent tubes;
    wherein another electrode of said first fluorescent tube is connected to a first inverter circuit, and another electrode of said second fluorescent tube is connected to a second inverter circuit;

wherein said pairs of fluorescent tubes are arranged at irregular intervals;

wherein at least two of arrangement intervals between said fluorescent tubes paired in said pairs of fluorescent tubes are different from each other, and wherein the arrangement intervals of the respective paired fluorescent tubes are narrowest in the vicinity of a predetermined boundary.

12. The display device according to claim 11, wherein the arrangement intervals of the respective pairs of fluorescent tubes are narrowest in the vicinity of a predetermined boundary in the arrangement direction, and the intervals are broadened further with distance from the boundary.

13. The display device according to claim 11, wherein the narrowest interval among the arrangement intervals of the respective pairs of fluorescent tubes is narrower than the arrangement interval of the paired fluorescent tubes.

14. The display device according to any one of claims 1 to 13, further comprising a support member that supports the end portions of the respective fluorescent tubes, wherein the support member includes a support portion that supports the fluorescent tubes that are arranged between the boundary and one end portion of the display area.

15. The display device according to any one of claims 1 to 13, further comprising a support member that supports the end portions of the respective fluorescent tubes, wherein the support member has a first support portion that supports the fluorescent tubes which are arranged between the boundary and one end portion of the display area at one of opposed two sides, and a second support portion that supports the fluorescent tubes which are arranged between the boundary and another end portion of the display area at another side.

16. The display device according to any one of claims 1 to 13, wherein a reflector is disposed at the back of the fluorescent tubes, and the reflector has convex portions between the respective pairs of fluorescent tubes.

17. A display device comprising:

a plurality of pairs of fluorescent tubes arranged at the back of a display area of a display panel, wherein each fluorescent tube in each pair of fluorescent tubes includes a light emission portion separate from the light emission portion of any other fluorescent tube, and said fluorescent tubes paired in each pair are connected in series having an electrical connection connecting one electrode of a first fluorescent tube to a corresponding electrode of a second fluorescent tube of the pair of fluorescent tubes;

wherein another electrode of said first fluorescent tube is connected to a first inverter circuit, and another electrode of said second fluorescent tube is connected to a second inverter circuit;

wherein at least two arrangement intervals between said fluorescent tubes paired in said pairs of fluorescent tubes are different from each other, and wherein the arrangement intervals of the respective pairs of fluorescent tubes are the smallest in the center of the display panel.

18. A display device comprising:

a plurality of pairs of fluorescent tubes arranged at the back of a display area of a display panel, wherein each fluorescent tube in each pair of fluorescent tubes includes a light emission portion separate from the light emission portion of any other fluorescent tube, and said fluorescent tubes paired in each pair are connected in series having an electrical connection connecting one electrode of a first fluorescent tube to an electrode of a second fluorescent tube of the pair of fluorescent tubes;

wherein another electrode of said first fluorescent tube is connected to a first inverter circuit, and another electrode of said second fluorescent tube is connected to a second inverter circuit;

wherein at least two arrangement intervals between said fluorescent tubes paired in at least two different pairs of fluorescent tubes are different from each other; and wherein a center of one pair among said pairs of fluorescent tubes substantially coincides with a center of the display area.

19. A display device comprising:

a plurality of pairs of fluorescent tubes arranged at the back of a display area of a display panel, wherein each fluorescent tube in each pair of fluorescent tubes includes a light emission portion separate from the light emission portion of any other fluorescent tube, and said fluorescent tubes paired in each pair are connected in series having an electrical connection connecting one electrode of a first fluorescent tube to an electrode of a second fluorescent tube of the pair of fluorescent tubes;

wherein another electrode of said first fluorescent tube is connected to a first inverter circuit, and another electrode of said second fluorescent tube is connected to a second inverter circuit;

wherein at least two arrangement intervals between said paired fluorescent tubes of said plurality of pairs of fluorescent tubes are different from each other; and wherein a center of one pair among said plurality of pairs of fluorescent tubes substantially coincides with a center of the display area; and wherein the arrangement intervals of the respective pairs of fluorescent tubes are larger in a periphery of the screen than the center of the display area.

20. A display device comprising:

a plurality of pairs of fluorescent tubes arranged at the back of a display area of a display panel, wherein pairs of the fluorescent tubes whose light emission portions are independent from each other are arranged at irregular intervals, wherein each fluorescent tube in each pair of fluorescent tubes includes a light emission portion separate from the light emission portion of any other fluorescent tube, and said fluorescent tubes paired in each pair are connected in series having an electrical connection connecting one electrode of a first fluorescent tube to an electrode of a second fluorescent tube of the pair of fluorescent tubes;

wherein another electrode of said first fluorescent tube is connected to a first inverter circuit, and another electrode of said second fluorescent tube is connected to a second inverter circuit;

wherein at least two arrangement intervals between said paired fluorescent tubes of said plurality of pairs of fluorescent tubes are substantially the same;

wherein a center of one pair among said pairs of fluorescent tubes substantially coincides with the center of the display area, and wherein the arrangement intervals of the respective pairs of fluorescent tubes are larger in the periphery of the screen than the center of the display area.

* * * * *